US 10,244,164 B1

(12) United States Patent
Banerjee et al.

(10) Patent No.: US 10,244,164 B1
(45) Date of Patent: Mar. 26, 2019

(54) SYSTEMS AND METHODS FOR IMAGE STITCHING

(71) Applicant: QUALCOMM Incorporated, San Diego, CA (US)

(72) Inventors: Sudipto Banerjee, Kolkata (IN); Pushkar Gorur Sheshagiri, Bengaluru (IN); Pawan Kumar Baheti, Bangalore (IN); Ajit Deepak Gupte, Bangalore (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 15/701,062

(22) Filed: Sep. 11, 2017

(51) Int. Cl.
| | |
|---|---|
| *H04N 5/232* | (2006.01) |
| *G06T 3/40* | (2006.01) |
| *G06T 3/00* | (2006.01) |
| *G06T 7/292* | (2017.01) |
| *G06T 7/50* | (2017.01) |

(52) U.S. Cl.
CPC ....... *H04N 5/23229* (2013.01); *G06T 3/4038* (2013.01); *G06T 7/292* (2017.01); *G06T 7/50* (2017.01); *G06T 3/0018* (2013.01); *G06T 3/0062* (2013.01); *G06T 2207/20221* (2013.01)

(58) Field of Classification Search
CPC ....... H04N 5/23229; G06T 7/50; G06T 7/292; G06T 3/4038; G06T 3/0018; G06T 3/0062; G06T 2207/20221
See application file for complete search history.

(56) References Cited

U.S. PATENT DOCUMENTS

| | | | |
|---|---|---|---|
| 2012/0154520 A1* | 6/2012 | Putraya | G06T 3/4038 348/36 |
| 2014/0078254 A1 | 3/2014 | Lin et al. | |
| 2014/0092210 A1 | 4/2014 | Tian et al. | |
| 2014/0321546 A1 | 10/2014 | Sakurai et al. | |
| 2014/0341289 A1 | 11/2014 | Schwarz et al. | |
| 2016/0050369 A1* | 2/2016 | Takenaka | H04N 1/387 348/222.1 |
| 2016/0050429 A1 | 2/2016 | Heo et al. | |
| 2017/0078653 A1* | 3/2017 | Bi | G06T 3/0062 |
| 2017/0287184 A1* | 10/2017 | Pettersson | G06T 11/60 |

(Continued)

OTHER PUBLICATIONS

Jiang W., et al., "Video Stitching With Spatial-Temporal Content-Preserving Warping", 2015 IEEE Conference on Computer Vision and Pattern Recognition Workshops (CVPRW), 2015, pp. 42-48.

*Primary Examiner* — Shahbaz Nazrul
(74) *Attorney, Agent, or Firm* — Austin Rapp

(57) ABSTRACT

A method performed by an electronic device is described. The method includes receiving a plurality of images from a first camera with a first field of view and a second plurality of images from a second camera with a second field of view. An overlapping region exists between the first field of view and the second field of view. The method also includes predicting a disparity of a moving object present in a first image of the first plurality of images. The moving object is not present in a corresponding second image of the second plurality of images. The method further includes determining warp vectors based on the predicted disparity. The method additionally includes combining an image from the first plurality of images with an image from the second plurality of images based on the determined warp vectors.

30 Claims, 28 Drawing Sheets

(56) References Cited

U.S. PATENT DOCUMENTS

2017/0347044 A1* 11/2017 Douady-Pleven ..... H04N 5/247
2017/0359561 A1* 12/2017 Vallespi-Gonzalez .......................
                                                    H04N 13/128
2018/0338126 A1* 11/2018 Trevor ............... H04N 5/23216

* cited by examiner

SYSTEMS AND METHODS FOR IMAGE STITCHING

FIELD OF DISCLOSURE

The present disclosure relates generally to electronic devices. More specifically, the present disclosure relates to systems and methods for image stitching.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images. Processing images may demand a relatively large amount of time, memory, and energy resources. The resources demanded may vary in accordance with the complexity of the processing.

Some kinds of images may be limited in view. Processing images to expand the view may be complex and may require a relatively large amount of processing resources to accomplish with high quality. Quality may be reduced as processing complexity is reduced. As can be observed from this discussion, systems and methods that improve image processing may be beneficial.

SUMMARY

A method performed by an electronic device is described. The method includes receiving a plurality of images from a first camera with a first field of view and a second plurality of images from a second camera with a second field of view. An overlapping region exists between the first field of view and the second field of view. The method also includes predicting a disparity of a moving object present in a first image of the first plurality of images. The moving object is not present in a corresponding second image of the second plurality of images. The method further includes determining warp vectors based on the predicted disparity. The method additionally includes combining an image from the first plurality of images with an image from the second plurality of images based on the determined warp vectors.

The method may include predicting an entrance time for the moving object to enter the overlapping region, where determining the warp vectors may be further based on the predicted entrance time. Predicting the entrance time may include tracking the moving object in the first plurality of images, determining a velocity of the moving object based on the tracking, and determining the entrance time based on the velocity and based on a distance between the moving object and the overlapping region.

Predicting the disparity may include performing object detection to determine a bounding box of the moving object. Predicting the disparity may also include determining the disparity based on a size of the bounding box. Predicting the disparity may be based on missing feature detection between at least one of the first plurality of images from the first camera and at least one of the second plurality of images from the second camera.

Predicting the disparity may be based on depth detection. Depth detection may be performed using a depth sensor.

Determining the warp vectors based on the predicted disparity may include averaging disparities corresponding to at least two different times. Determining the warp vectors may include determining whether a first disparity difference of a current frame disparity and the predicted disparity of a look-ahead frame is greater than a first threshold and may include applying a non-causal filter to the current frame disparity and the predicted disparity in a case that the first disparity difference is greater than the first threshold. Determining the warp vectors may include determining whether a second disparity difference of the current frame disparity and the predicted disparity of the look-ahead frame is greater than a second threshold and may include applying a causal filter to the current frame disparity and the predicted disparity in a case that the second disparity difference is greater than the second threshold.

Combining an image from the first plurality of images with an image from the second plurality of images may include performing dynamic warping on the image from the first plurality of images to produce a first warped image and on the image from the second plurality of images to produce a second warped image and combining the first warped image and the second warped image. The method may include performing color correction on at least one of the first warped image and the second warped image.

An electronic device is also described. The electronic device includes a memory. The electronic device also includes a processor coupled to the memory. The processor is configured to receive a plurality of images from a first camera with a first field of view and a second plurality of images from a second camera with a second field of view. An overlapping region exists between the first field of view and the second field of view. The processor is also configured to predict a disparity of a moving object present in a first image of the first plurality of images. The moving object is not present in a corresponding second image of the second plurality of images. The processor is further configured to determine warp vectors based on the predicted disparity. The processor is additionally configured to combine an image from the first plurality of images with an image from the second plurality of images based on the determined warp vectors.

A non-transitory tangible computer-readable medium storing computer executable code is also described. The computer-readable medium includes code for causing an electronic device to receive a plurality of images from a first camera with a first field of view and a second plurality of images from a second camera with a second field of view. An overlapping region exists between the first field of view and the second field of view. The computer-readable medium also includes code for causing the electronic device to predict a disparity of a moving object present in a first image of the first plurality of images. The moving object is not present in a corresponding second image of the second plurality of images. The computer-readable medium further includes code for causing the electronic device to determine warp vectors based on the predicted disparity. The computer-readable medium additionally includes code for causing the electronic device to combine an image from the first plurality of images with an image from the second plurality of images based on the determined warp vectors.

An apparatus is also described. The apparatus includes means for receiving a plurality of images from a first camera with a first field of view and a second plurality of images from a second camera with a second field of view. An overlapping region exists between the first field of view and the second field of view. The apparatus also includes means for predicting a disparity of a moving object present in a first image of the first plurality of images. The moving object is not present in a corresponding second image of the second plurality of images. The apparatus further includes means for determining warp vectors based on the predicted disparity. The apparatus additionally includes means for combining an image from the first plurality of images with an image from the second plurality of images based on the determined warp vectors.

DETAILED DESCRIPTION

Figure 1:
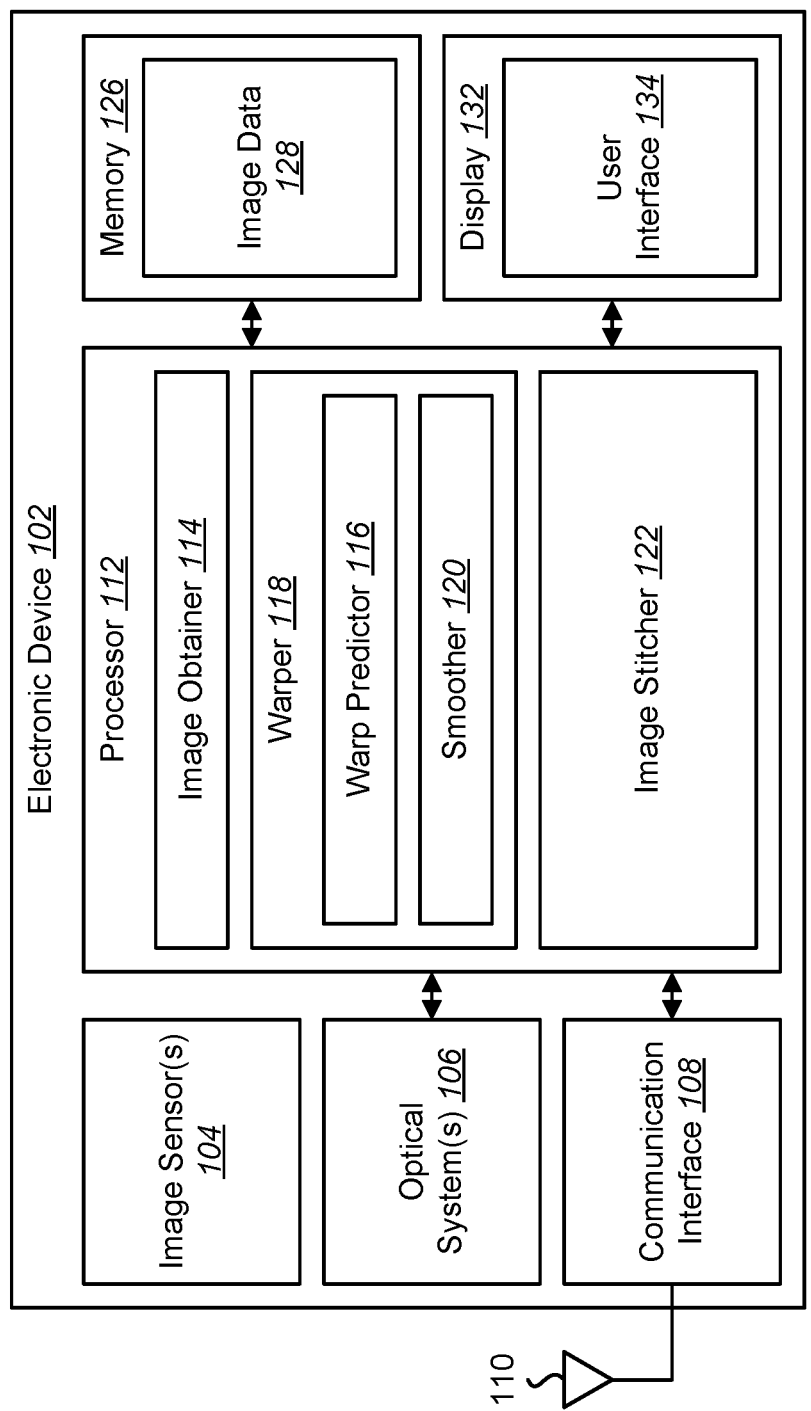
FIG. 1 is a block diagram illustrating one example of an electronic device in which systems and methods for image stitching may be implemented.

The systems and methods disclosed herein may relate to image stitching. For example, some configurations of the systems and methods disclosed herein may relate to temporally consistent low latency stitching of inputs from multiple cameras.

Wide-view content (e.g., 360-degree video content) may increasingly gain importance, as it may serve multiple applications (e.g., virtual reality, surveillance, etc.). For example, 4K or greater low latency video stitching and streaming may be a key to increase consumer adoption. Low latency video stitching and/or streaming may enable first person gaming experiences (e.g., drone racing).

Some examples of a capture setup may include multiple cameras covering a wide field of view (FOV) (e.g., a 360-degree FOV) in horizontal and/or vertical directions. One setup may include a dual wide-angle lens-based capture system. For example, an electronic device may include two fish-eye cameras, each with a FOV greater than 180 degrees. Other setups may include multiple wide-angle cameras (e.g., eight or sixteen action cameras combined in a ring or spherical arrangement). Data from each camera may be concurrently (e.g., synchronously) captured and/or stitched together to generate a 360-degree canvas. It should be noted that the systems and methods disclosed herein may be applicable for image and/or video use-cases.

Some objectives of the systems and methods disclosed herein may include reducing (e.g., minimizing) temporal, parallax, and/or motion artifacts (e.g., structure deformation, ghosting, etc.) in a stitched canvas (e.g., 360-degree stitched canvas) based on inputs from multiple cameras. For example, the difference between the optical centers of the cameras in multi-camera rigs may result in parallax error when stitching the respective inputs from these cameras. Object motion across the overlap region may lead to ghosting artifacts as well.

One or more approaches may be utilized for stitching. Static seam-based stitching may stitch along a fixed seam in an overlapping region. Static seam-based stitching may be simple and less complex, but may show abrupt changes in objects near the camera due to parallax. While static seam-based stitching may be utilized due to complexity concerns, it may not yield very good quality in some cases. Dynamic seam-based stitching is another approach. For example, dynamic seam-based stitching may be utilized for producing panoramic images. Dynamic seam-based stitching may utilize a cost function-based approach to determine the seam. Dynamic seam-based stitching may not address structural continuity across the seam. Dynamic warp-based stitching is another approach. In some implementations, dynamic warp-based stitching may utilize a double seam in the overlapping region. Dynamic warp-based stitching may identify feature correspondences across the two seams and may stretch content in the overlap region to align these features. Dynamic warp-based stitching may potentially address parallax better than the above approaches, but may still damage the image if feature correspondences are false. The systems and methods disclosed herein may provide quality improvements in addressing some of the problems described above.

Some configurations of the systems and methods disclosed herein may provide an approach that is based on content in an overlapping region. For example, a stitching scheme may be selected based on the content in the overlapping region. In some configurations, the systems and methods disclosed herein may adaptively combine static seam, dynamic seam, and/or dynamic warp-based stitching techniques based on scene analysis. Techniques for scene analysis may include disparity vectors in two overlapping image regions, image motion in an overlapping region, and/or object detection (e.g., face detection) in an overlapping region.

Some configurations of the systems and methods disclosed herein may include determining a blending region size (e.g., width) adaptively based on motion and/or disparity in the overlapping area. For example, blending region size may be smaller with less motion and/or a large disparity or may be larger with more motion.

Some configurations of the systems and methods disclosed herein may include utilizing an alternate image representation of wide-angle (e.g., fisheye) images. For example, one or more overlapping regions of wide-angle images may be transformed to produce a transformed image. The transformed image may have a different shape than the original region. For example, a curved overlapping region of a wide-angle image may be transformed to produce a rectangular image. The transformed image may be utilized to compute stitching (e.g., warping map and/or dynamic seam, etc.). In some configurations, the alternate image representation (e.g., transformed image) may help to reduce stitching complexity (e.g., the complexity of dynamic seam and/or dynamic warp algorithms). Additionally or alternatively, the alternate image representation may help to avoid distortion that may be present near poles in an equi-rectangular image representation.

Some configurations of the systems and methods disclosed herein may provide approaches for predicting the depth and/or disparity (in dual fisheye cameras, for example) of foreground objects before they enter an overlapping region. For example, some approaches may use stereo 360-degree cameras. In some approaches, the predicted depth and/or disparity may be a function of a bounding box around known objects (e.g., faces, pedestrians, etc.). In some approaches, the disparity may be ramped up based on missing features between two cameras. Predicting disparity (e.g., target disparity) may be beneficial by enabling low-latency (e.g., real time) stitching.

In some configurations, warping may be started such that a target disparity is achieved when the foreground object (e.g., a moving object) enters the overlapping region. For example, a time when the object is going to enter overlapping region may be predicted using a constant velocity model (e.g., a constant velocity optical flow model). In some approaches, prediction may be based on the depth and/or size of the object.

Some configurations of the systems and methods disclosed herein may provide approaches for reducing (e.g., eliminating) temporal distortion and/or artifacts by performing adaptive filtering. For example, target disparity may be achieved by the time the foreground object (e.g., moving object) enters the overlapping region. The disparity may begin to be decayed when the foreground object starts exiting the overlapping region.

Some configurations of the systems and methods disclosed herein may provide approaches for warping and stitching dual fisheye camera images and/or videos using predicted and computed (e.g., measured) disparity values. For example, some approaches may provide low-latency solutions to stitch 360 degree videos from a dual-fisheye camera setup. A different number of (e.g., two or more) cameras and/or different types of cameras may be utilized. Some configurations of the systems and methods disclosed herein may provide approaches to reduce (e.g., fix) stitching artifacts arising due to small calibration errors using dynamic warp. Some approaches may automatically resort to static seam stitching (smoothly, for example) if the object moves close to the camera. This may help avoid unnecessary distortion and flickering.

Some configurations of the systems and methods disclosed herein may include a technique to reduce computational complexity by limiting utilization of complex image processing. For example, some configurations of the systems and methods disclosed herein may use dynamic warp-based stitching in one or more sub-regions of an image (e.g., only where needed in the image).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for image stitching may be implemented. Examples of the electronic device 102 may include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry), in a combination of hardware and software (e.g., a processor with instructions) and/or in a combination of hardware and firmware.

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system(s) 106. Additionally or alternatively, the electronic device 102 may or may not include a display 132. Additionally or alternatively, the electronic device 102 may or may not include a communication interface 108.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In some configurations, one or more of the images described herein (e.g., wide-angle images, telephoto images, stitched images, etc.) may be presented on the display 132 and/or user interface 134.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The electronic device 102 (e.g., image obtainer 114) may obtain (e.g., receive) one or more images (e.g., digital images, image frames, frames, video, wide-angle images, telephoto images, etc.). The one or more images (e.g., frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras and/or may include one or more cameras in some implementations. In some configurations, the image sensor(s) 104 may capture (e.g., receive) the one or more images (e.g., image frames, video, still images, burst mode images, stereoscopic images, wide-angle images, telephoto images, etc.). In some configurations, the image sensor(s) 104 may capture the one or more images. In some implementations, the electronic device 102 may include multiple optical system(s) 106 and/or multiple image sensors 104. For example, the electronic device 102 may include multiple wide-angle lenses (e.g., fisheye lenses), multiple "normal" lenses, multiple telephoto lenses, and/or a combination of different kinds of lenses in some configurations. Different lenses may each be paired with separate image sensors 104 in some configurations. Additionally or alternatively, two or more lenses may share the same image sensor 104.

Additionally or alternatively, the electronic device 102 may request and/or receive the one or more images from another device (e.g., one or more external image sensors coupled to the electronic device 102, a network server, traffic camera, drop camera, automobile camera, web camera, smartphone camera, etc.). In some configurations, the electronic device 102 may request and/or receive the one or more images via the communication interface 108. For example, the electronic device 102 may or may not include a camera (e.g., an image sensor 104 and/or optical system 106) and may receive images (e.g., wide-angle image(s), normal image(s), and/or telephoto image(s)) from one or more remote devices.

The memory 126 may store instructions and/or data. The processor 112 may access (e.g., read from and/or write to) the memory 126. Examples of instructions and/or data that may be stored by the memory 126 may include image data 128 (e.g., wide-angle image data, normal image data, telephoto image data, etc.), features, feature vectors, keypoint data, corner data, line segment data, transform data, seam data, image obtainer 114 instructions, warper 118 instructions, smoother 120 instructions, image stitcher 122 instructions, instructions corresponding to one or more stitching schemes, and/or instructions for other elements, etc.

In some configurations, the electronic device 102 (e.g., the memory 126) may include an image data buffer (not shown). The image data buffer may buffer (e.g., store) image data (e.g., image frame(s)) from the image sensor(s) 104. The buffered image data may be provided to the processor 112.

In some configurations, the electronic device 102 may include a camera software application and/or a display 132. When the camera application is running, images of scenes and/or objects that are located within the field of view of the optical system(s) 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system(s) 106 are presented on the display 132. The one or more images (e.g., wide-angle image(s), normal image(s), telephoto image(s), stitched images, combined images, etc.) obtained by the electronic device 102 may be one or more video frames, one or more still images, and/or one or more burst frames, etc. It should be noted that the systems and methods disclosed herein may be applied to two or more images and/or to two or more series of images (e.g., multiple wide-angle video streams, multiple normal video streams, multiple telephoto video streams, combinations of different kinds of video streams, etc.).

The processor 112 may include and/or implement an image obtainer 114, a warper 118, and/or an image stitcher 122. In some configurations, the warper 118 may include a smoother 120. In some configurations, the image stitcher 122 may include one or more stitching schemes. It should be noted that one or more of the elements illustrated in the electronic device 102 and/or processor 112 may be optional. For example, the warper 118, the smoother 120, the image stitcher 122, and/or the stitching scheme(s) may or may not be included and/or implemented. Additionally or alternatively, one or more of the elements illustrated in the processor 112 may be implemented separately from the processor 112 (e.g., in other circuitry, on another processor, on a separate electronic device, etc.).

The processor 112 may include and/or implement an image obtainer 114. One or more images (e.g., image frames, video, burst shots, etc.) may be provided to the image obtainer 114. For example, the image obtainer 114 may obtain (e.g., receive) image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 and/or may be captured from one or more remote camera(s). In some configurations, the image obtainer 114 may obtain multiple images (e.g., multiple wide-angle images, multiple normal images, multiple telephoto images, and/or a combination of different kinds of images).

A wide-angle image may be captured with a wide-angle lens. A wide-angle lens may have a shorter focal length and a wider field of view (FOV) (e.g., a greater angular range) than a telephoto lens. For example, a wide-angle lens may have an equal or a shorter focal length and/or may provide an equal or a larger field of view than a "normal" lens. In one example, a 28 millimeter (mm) lens relative to a full-frame image sensor may be considered a "normal" lens. For instance, a lens with a 28 mm focal length may be utilized in smartphone cameras. Lenses with focal lengths equal to or shorter than a normal lens (e.g., 28 mm) (relative to a full-frame sensor, for example) may be considered "wide-angle" lenses, while lenses with focal lengths equal to or longer than a normal lens (e.g., 28 mm) may be considered "telephoto" lenses. In other examples, lenses with other focal lengths (e.g., 50 mm) may be considered "normal" lenses. It should be noted that the systems and methods disclosed herein may be implemented with multiple lenses of equal or different focal lengths. Configurations described herein with reference to two wide-angle lenses may be additionally or alternatively implemented with multiple (e.g., two or more) lenses with equal or different focal lengths and/or lenses of the same or different types (e.g., multiple wide-angle lenses, multiple telephoto lenses, a wide-angle lens and a telephoto lens, etc.).

It should be noted that a telephoto image may be captured with a telephoto lens. For example, the telephoto lens may have a narrower FOV (e.g., a lesser angular range) than a wide-angle lens. A telephoto lens may enable capturing greater detail and/or magnified images in comparison with a wide-angle lens. Additionally or alternatively, a telephoto lens may have a longer focal length, may provide equal or greater magnification, and/or may provide a smaller field of view than a "normal" lens.

In some configurations, the image obtainer 114 may request and/or receive one or more images (e.g., image frames, wide-angle images, telephoto images, etc.). For example, the image obtainer 114 may request and/or receive one or more images from a remote device (e.g., external camera(s), remote server, remote electronic device, etc.) via the communication interface 108.

In some configurations, the electronic device 102 (e.g., processor 112, image obtainer 114, warper 118, image stitcher 122, etc.) may transform one or more areas of one or more images. Transforming one or more areas of the image(s) may reduce computational complexity for content analysis. For example, the electronic device 102 may transform one or more overlapping regions of one or more images. In some approaches, the image obtainer 114 may obtain wide-angle (e.g., fisheye) images. The electronic device 102 may transform the overlapping regions in the wide-angle images into rectangular images using a geometrical transformation. For example, the electronic device 102 (e.g., processor 112, image obtainer 114, warper 118, etc.) may transform one or more curved overlapping regions of the wide-angle images into rectangular images (e.g., regions) using a geometrical transformation.

In some configurations, the processor 112 (e.g., warper 118, smoother 120, etc.) may determine one or more sub-regions of the rectangular images based on content measure(s). For instance, the processor 112 may divide (e.g., partition) the rectangular images into sub-regions that contain motion, nearby object(s), and/or one or more object(s) that cover a portion of the rectangular image. In some approaches, one or more portions with an amount of motion, an amount of disparity, and/or an amount of object coverage may be separated from one or more other areas. In some approaches, the rectangular image(s) (e.g., transformed overlapping region(s)) may be partitioned along one or more straight lines. For example, the rectangular images may be partitioned horizontally and/or vertically (across the span of the rectangular image, for instance). Additionally or alternatively, the rectangular image(s) (e.g., transformed overlapping region(s)) may be partitioned along a seam that may be linear and/or curved (e.g., meandering). A stitching scheme may be selected for each of the sub-regions. For example, different stitching schemes may be selected for two or more sub-regions in some cases.

In some configurations (where a region transform is performed, for example), the electronic device 102 (e.g., processor 112, image obtainer 114, warper 118, image stitcher 122, etc.) may determine a mapping between the images (e.g., input images, wide-angle images, normal images, telephoto images, etc.) and the transformed region(s). The content analysis, warp prediction, and/or smoothing may be carried out based on the transformed images (e.g., transformed overlapping regions). The mapping may indicate a correspondence between the transformed images and the original images (and/or the equi-rectangular domain). The image stitcher 122 may utilize the mapping to apply the selected stitching scheme(s) to the images (in the equi-rectangular domain, for example).

One or more of the images may include one or more moving objects. A moving object may be moving in the image(s) due to movement of the object itself (relative to a scene or background, for example) and/or due to movement of the image sensor(s) 104 that capture the image. For instance, a moving object may be changing position through a series of images (e.g., image frames, video, etc.). A moving object may cause one or more artifacts, particularly in an overlapping region between stitched images. More detail regarding potential artifacts is given in connection with FIGS. 4 and 6-7. Some configurations of the systems and methods disclosed herein may reduce and/or avoid artifacts.

In some configurations, the processor 112 may include and/or implement a stitching scheme selector (not shown). The stitching scheme selector may select a stitching scheme for stitching at least two images. For example, the stitching scheme selector may select a stitching scheme from a set of stitching schemes (e.g., two or more stitching schemes) based on one or more content measures. In some configurations, the stitching scheme selector may select multiple stitching schemes for stitching the at least two images (e.g., for stitching two or more sub-regions of the images).

In some configurations, the stitching scheme selector may include a content analyzer (not shown). The content analyzer may analyze the content of one or more images to determine one or more content measures. Examples of content measures may include a motion measure, a disparity measure, a coverage measure, and/or an object detection measure, etc. In some configurations, the processor 112 (e.g., stitching scheme selector) may determine areas (e.g., sub-regions) of one or more images based on the content measures. In some configurations, the processor 112 (e.g., stitching scheme selector) may determine content measures for one or more areas (e.g., sub-regions) of one or more images.

The processor 112 may include and/or implement a warper 118. The warper 118 may determine and/or perform warping (e.g., one or more warp vectors) for one or more images. A warp vector may indicate an amount and/or direction of warping for image data (e.g., one or more pixels). For example, warping may spatially warp (e.g., stretch, shift, bend, flex, and/or compress, etc.) image data. Warping may be performed in order to align image data (e.g., align features of the images) between images and/or to reduce or avoid artifacts (e.g., temporal artifacts, parallax artifacts, motion artifacts, structure deformation artifacts, and/or ghosting artifacts, etc.) in a stitched image. In some configurations, the warper 118 may determine and/or perform warping for one or more images (e.g., for one or more sub-regions of the image(s), a series of images, frames, and/or video, etc.).

In some configurations, the warper 118 may determine (e.g., measure) disparity between images. In an overlapping region between images, for example, the disparity may be a difference (e.g., distance and/or direction) between corresponding points (e.g., points of an object) appearing in both images. The disparity may be a function of depth. For example, a distant object may exhibit a smaller disparity between cameras (e.g., images), while a nearby object may exhibit a larger disparity between cameras (e.g., images).

In some approaches, the electronic device 102 (e.g., processor 112) may perform disparity filtering. For example, one or more disparity values (e.g., predicted disparities and/or measured disparities) may be incorrect. The electronic device 102 may remove, eliminate, and/or not consider one or more disparity values that do not meet one or more criteria. For instance, one or more disparity values that indicate a shift in an incorrect direction may be eliminated or not considered. Additionally or alternatively, one or more disparity values that are too large (e.g., that are beyond a threshold or that would go beyond an overlapping region) may be eliminated or not considered.

The disparity may be determined by comparing images. In some approaches, for example, the warper 118 may compare images from different lenses, cameras, viewpoints, and/or perspectives. Additionally or alternatively, the images utilized to determine the disparity may be captured at approximately the same time (e.g., synchronously, concurrently, etc.). The disparity may indicate an amount of disparity (e.g., difference) between the images (e.g., stereoscopic images). For example, the disparity may indicate one or more distances (in pixels, for instance) between object positions in the images. In some approaches, the disparity measure may provide an indication of object depth. For example, an object with a relatively large disparity between images may be closer to the lenses, sensors, cameras, etc., while an object with less disparity may be further from the lenses, sensors, cameras, etc. Additionally or alternatively, the disparity measure may be based on depth sensor (e.g., time-of-flight camera, lidar, etc.) data. For example, the disparity measure may indicate an amount of distance (e.g., depth) between an object in the image and a depth sensor.

In some configurations, the warper 118 may include a warp predictor 116. The warp predictor 116 may predict one or more warping parameters. Examples of predicted warping parameters may include predicted disparity, predicted depth, and/or predicted entrance time. For instance, the warp predictor 116 may predict a disparity (e.g., one or more disparity values) of a moving object. The disparity may be predicted before the moving object enters an overlapping region between images.

In some approaches, the warp predictor 116 may predict the disparity based on depth sensing (e.g., stereoscopic cameras, lidar, radar, etc.). For example, the warp predictor 116 may obtain depth data from stereoscopic cameras (e.g., 360 degree stereoscopic cameras) that may be utilized to determine the disparity. For instance, the depth data may indicate a depth of the moving object from one or more cameras, which may indicate a predicted disparity of the moving object once the moving object reaches the overlapping region (and/or a blending region). It should be noted that in some configurations, the stereoscopic cameras utilized to determine the depth may be different from the cameras utilized for capturing the images for stitching (e.g., at least one lens may be different between pairs of cameras). Additionally or alternatively, the overlapping region (e.g., blending region) may be a subset of an overlapping area of the stereoscopic cameras. More detail is given in connection with FIG. 12.

In some configurations, the electronic device 102 (e.g., processor 112) may select one or more blending regions. A blending region may be an area for blending at least two images (in an overlapping region, for instance). For example, a blending region may be an area along a seam in which two images may be blended. In some approaches, the blending region may be larger for areas with larger motion. For areas with approximately static content, a small blending region may help to reduce a potential ghosting artifact due to parallax. Additionally or alternatively, for areas with a large disparity, a small blending region may help to reduce a potential ghosting artifact due to parallax. The electronic device 102 (e.g., processor 112, image stitcher 122, etc.) may blend the images in the blending region. It should be noted that the blending region may be smaller than the overlapping region. Blending the images may produce a blended output, which may be a weighted combination of the images (e.g., two input images).

In some approaches, the warp predictor 116 may predict the disparity and/or depth based on object size. For example, the warp predictor 116 may determine a disparity and/or depth based on the size of a bounding box for a known object type (e.g., face, body, etc.). For instance, the electronic device 102 (e.g., processor 112) may perform object detection to detect an object (e.g., moving object) and/or to determine a bounding box of the object. In some approaches, object detection may be performed by searching the image (e.g., one or more areas of the image at one or more scales) for the object (e.g., keypoints of an object, feature vectors of an object, etc.). The bounding box may be determined as an area (e.g., rectangular area) that includes and bounds the object. The size of the bounding box may be utilized to determine the disparity and/or depth. For example, the size of a bounding box of a face in an image may be utilized to determine the depth of the face in the image. In particular, the bounding box size may correspond to a particular depth of the face in the image. Accordingly, the predicted disparity may be based only on image data from a single camera in some approaches.

Estimating depth of known objects may be beneficial. For example, computing a dense depth map from a stereo depth camera may be computationally expensive. In some applications, a dense depth map may not be required.

In some approaches, the electronic device 102 may have prior knowledge of an object (e.g., foreground object, moving object, etc.). The electronic device 102 (e.g., warp predictor 116) may approximate depth from some prior data (e.g., size and/or shape, etc.). For example, depth of a known foreground object may be approximated by the size of bounding box enclosing the object. Distant (e.g., far away) objects will be enclosed by smaller bounding box, which may imply higher depth and/or lower disparity. Nearby (e.g., close) objects will be enclosed by a larger bounding box, which may imply lower depth and/or higher disparity. More detail is given in connection with FIG. 12.

In some approaches, the warp predictor 116 may predict the disparity and/or depth based on one or more missing features. For example, the warp predictor 116 may determine a disparity and/or depth based on whether one or more features do not appear in an overlapping region. For instance, if a feature of an object appears in the overlapping area of one image but not in another, the warp predictor 116 may determine (e.g., assume) a minimum disparity. More detail is given in connection with FIG. 13.

In some configurations, the warp predictor 116 may predict one or more entrance times. For example, the warp predictor 116 may predict an entrance time at which a moving object may enter an overlapping region. Additionally or alternatively, the warp predictor 116 may predict an entrance time at which a moving object may enter a blending region (where the blending region may be a subset of the overlapping region, for example). In some approaches, the warp predictor 116 may track the moving object over two or more frames. For instance, the warp predictor 116 may determine one or more motion vectors (e.g., optical flow vectors) corresponding to the moving object. For example, the motion vector(s) may be determined by comparing a current image (e.g., current frame, current rectangular image, etc.) to one or more past images (e.g., previous frame, previous rectangular image, etc.). In some approaches, for example, the images utilized to determine the motion vector(s) may be taken at different times (from the same lens, sensor, camera, etc.). The motion vector(s) may indicate an amount of movement between the images (e.g., current frame and previous frame). For example, the motion vector(s) may indicate a distance (in pixels, for instance) that an object has moved between the images. Additionally or alternatively, the motion vector(s) may be based on motion sensor (e.g., accelerometer) data. For example, the motion vector(s) may indicate an amount of movement (e.g., rotation, translation, etc.) of the electronic device 102 between images. The motion vector(s) may indicate a velocity (e.g., pixels per frame, inches per second, etc.) at which the moving object is approaching the overlapping region (and/or blending region). Based on the velocity, the warp predictor 116 may determine a predicted entrance time and/or frame number at which the moving object may enter the overlapping region (and/or blending region).

The warper 118 may determine warp vectors based on the predicted disparity (and/or predicted depth) and the predicted entrance time. The warp vectors may increase over a number of frames from an initial disparity (e.g., no disparity) to the predicted disparity (for a moving object entering an overlapping region and/or blending region, for example). In some approaches, the warp vectors (e.g., warp vector size) may be determined in accordance with a warping ramp. The warping ramp may have a slope (e.g., a predetermined slope) between an initial disparity (e.g., no disparity) and the predicted disparity (e.g., target disparity) over time (e.g., frames). Additionally or alternatively, the warp vectors may be determined according to an incremental step size over each frame.

The warper 118 may determine when to start applying warp vectors to the one or more images based on the predicted disparity and the predicted entrance time. Greater disparity (and/or less depth) may correspond to an earlier start time than a start time for less disparity (and/or more depth). In some approaches, the start time (e.g., start frame) may be based on the predicted entrance time. For example, the start time may be determined relative to the predicted entrance time. For instance, the warper 118 may determine a warping start time by determining an amount of time (e.g., frames) for the warping ramp to transition from the initial disparity to the predicted disparity at the predicted entrance time. Additionally or alternatively, the warper 118 may determine an amount of time (e.g., a number of frames) before the predicted entrance time for incrementally increasing warp to a predicted disparity (e.g., target disparity). Examples are provided in connection with FIG. 14.

In some configurations, the warper 118 may include a smoother 120. The smoother 120 may perform temporal smoothing and/or look-ahead in some approaches. For example, the smoother 120 may utilize and/or maintain a look-ahead disparity buffer. The look-ahead disparity buffer may include one or more disparities (e.g., one or more measured disparities and/or one or more predicted disparities) corresponding to one or more frames.

In a case of a disparity increase, the smoother 120 may apply a non-causal filter. For example, if a subsequent disparity is greater than a current disparity by an amount (e.g., a threshold amount), the smoother 120 may average across one or more subsequent frames (e.g., average using the disparities for one or more subsequent frames). In a case of a disparity decrease, the smoother 120 may apply a causal filter. For example, if a current disparity is greater than a subsequent disparity by an amount (e.g., a threshold amount), the smoother 120 may average across one or more past frames (e.g., average using the disparities for one or more past frames). In some approaches, the smoother 120 may average disparity values. An example of an approach for smoothing is given in connection with FIG. 16.

In some configurations, the warper 118 may warp one or more images. For example, the warper 118 may perform dynamic warping based on the warp vector(s). In some approaches, the warper 118 may warp one or more vertex points based on the warp vector(s) (and/or disparity vector(s)). In some configurations, warping the vertex point(s) may produce a warped vertex (e.g., vertices) map. For instance, vertex warping may be performed based on transformed images (e.g., rectangular images). The transformed images may map to other images (e.g., pre-transformed, original images, wide-angle images, etc.). Accordingly, the warped vertex map may be utilized to apply the warping to the other image(s). For example, the image stitcher 122 may apply the warped vertex map to obtain one or more output equi-rectangular images.

The processor 112 may include and/or implement an image stitcher 122. The image stitcher 122 may combine (e.g., fuse, stitch, etc.) images to form a combined image. For example, the image stitcher 122 may replace image data from one image (e.g., a first wide-angle image) with image data from another image (e.g., a second wide-angle image) and/or may combine image data from multiple images to produce the combined image. For instance, the image stitcher 122 may stitch two or more images (e.g., telephoto images, normal images, wide-angle images, and/or fisheye images, etc.) to produce a panoramic image and/or a surround view image (e.g., a 360-degree canvas) of a scene. The surround view image may provide a surrounding view (e.g., a 360-degree view in azimuth and/or elevation, a spherical view, etc.) relative to an observation point.

The image stitcher 122 may combine images based on the dynamic warping. For example, the image stitcher 122 may combine one or more images that have been dynamically warped. Additionally or alternatively, the image stitcher 122 may apply a warping map (e.g., warped vertex map) to one or more images to combine images.

In some configurations, the image stitcher 122 may stitch the images based on one or more selected stitching schemes. In some approaches, the image stitcher 122 may utilize multiple stitching schemes, each for stitching one or more areas (e.g., an area of an overlapping region, a partitioned area, a sub-region, etc.) of the images. Examples of stitching schemes 124 may include static seam-based stitching, dynamic seam-based stitching, and dynamic warp-based stitching. In some approaches, the image stitcher 122 may perform color correction (e.g., gamma-based color correction using a disparity or map). For example, the image stitcher 122 may perform color correction based on the disparity to remove one or more nearby objects, which may only be visible in one of the images (e.g., cameras), while computing a correction map.

In some configurations, the image stitcher 122 may be implemented in one or more blocks. For example, the image stitcher 122 may be implemented in one or more blocks (e.g., circuitries) included in and/or separate from the processor 112. For instance, different stitching schemes may be implemented in and/or performed by different blocks. In some configurations, static seam-based stitching may be implemented on and/or performed by the processor 112, while dynamic warp-based stitching may be implemented on and/or performed by a graphics processing unit (GPU). In some configurations, all stitching schemes may be implemented in hardware separate from the processor 112. For example, the processor 112 may not include the image stitcher 122, and the image stitcher 122 may be implemented in a different block (e.g., dedicated hardware, GPU, etc.) in the electronic device 102.

It should be noted that one or more of the functions and/or operations described herein may be performed for a series of images (e.g., image frames, video, etc.). For example, the electronic device 102 may obtain a series of images, perform warp prediction for a series of images, perform smoothing for a series of images, perform warping for a series of images, and/or perform stitching for a series of images.

It should be noted that one or more of the elements or components of the electronic device 102 may be combined and/or divided. For example, one or more of the image obtainer 114, the warper 118, the warp predictor 116, the smoother 120, and/or the image stitcher 122 may be combined. Additionally or alternatively, one or more of the image obtainer 114, the warper 118, the warp predictor 116, the smoother 120, and/or the image stitcher 122 may be divided into elements or components that perform a subset of the operations thereof.

Figure 2:
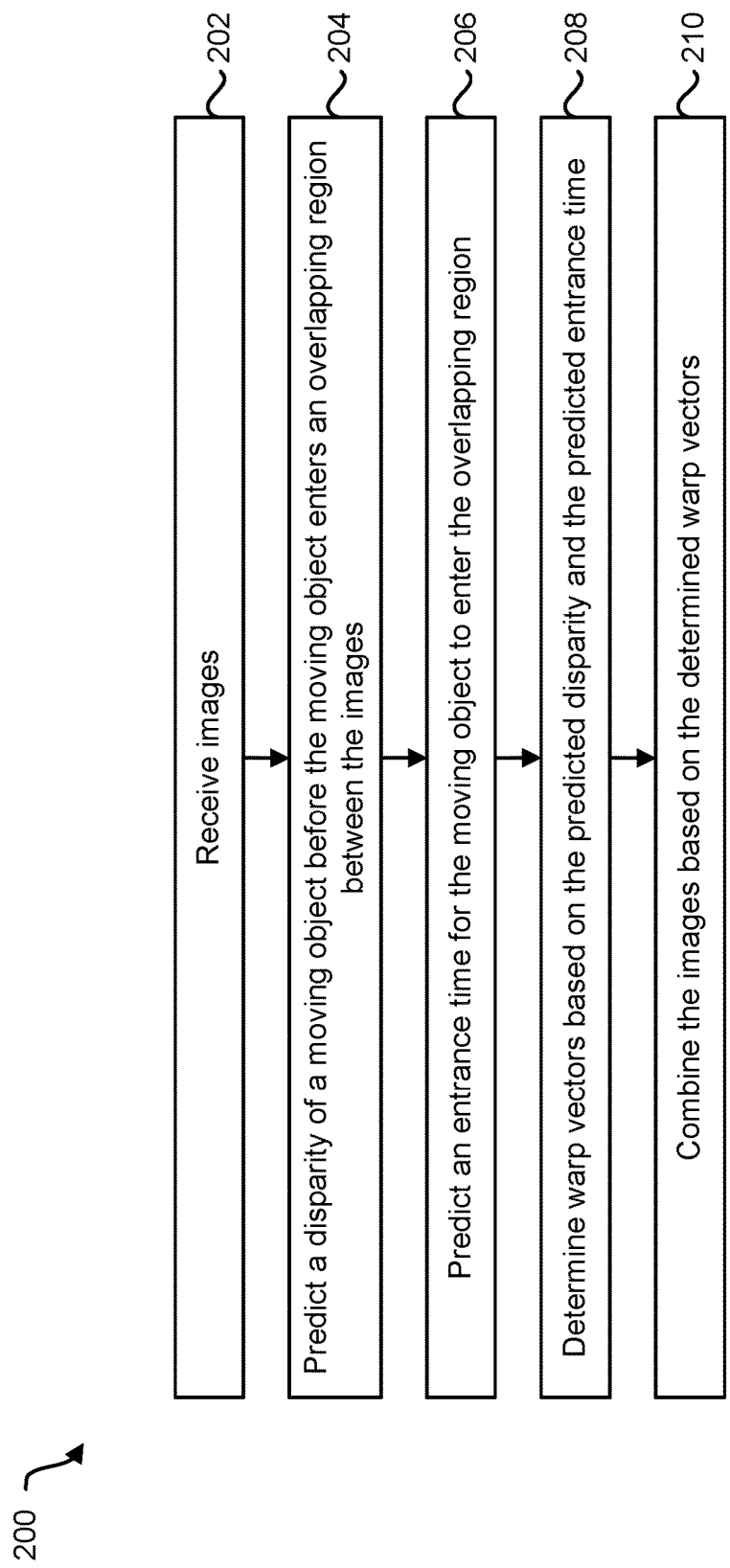
FIG. 2 is a flow diagram illustrating one configuration of a method for image stitching.

FIG. 2 is a flow diagram illustrating one configuration of a method 200 for image stitching. The method 200 may be performed by the electronic device 102, for example. The electronic device 102 may receive 202 images (e.g., two or more images). This may be accomplished as described in relation to FIG. 1. For example, the electronic device 102 may capture wide-angle images (with multiple wide-angle lenses, for instance) and/or may receive wide-angle images from another device. In some approaches, the electronic device 102 receive images from a first camera and images from a second camera. The first camera may have a first field of view and the second camera may have a second field of view. An overlapping region may exist between the first field of view and the second field of view.

The electronic device 102 may predict 204 a disparity (and/or depth) of a moving object before the moving object enters an overlapping region between the images. This may be accomplished as described in relation to FIG. 1. For example, the electronic device 102 may predict 204 the disparity (and/or depth) of the moving object while the moving object is present in one or more images from the first camera but is not present in one or more images from the second camera. In some approaches, the electronic device 102 may predict the disparity (and/or depth) of a moving object based on object size (e.g., bounding box size), depth detection, and/or missing feature detection.

The electronic device 102 may predict 206 an entrance time for the moving object to enter the overlapping region. This may be accomplished as described in connection with FIG. 1. For example, the electronic device 102 may track the moving object to determine a velocity at which the moving object is approaching the overlapping region (and/or blending region). Based on the velocity of the moving object (e.g., the velocity in the image) and the distance (e.g., pixel distance) between the moving object and the overlapping region (and/or blending region), for instance, the electronic device 102 may determine a time (e.g., an amount of time, a subsequent frame, etc.) at which the moving object may enter the overlapping region (and/or blending region).

The electronic device 102 may determine 208 warp vectors based on the predicted disparity and the predicted entrance time. For example, the electronic device 102 may determine one or more warp vectors for one or more images (e.g., image frames), where the warping occurs gradually (e.g., incrementally, and/or in accordance with a warping ramp, etc.).

The electronic device 102 may combine 210 the images based on the determined warp vectors. This may be accomplished as described in relation to FIG. 1. For example, the electronic device 102 may perform dynamic warping on one or more of the images (from one or more cameras, for instance) based on the warp vectors and/or may perform image combining (e.g., fusion, stitching, etc.) on the warped images. In some approaches, the electronic device 102 may warp one or more images (e.g., image data, one or more vertex points of an image, etc.) in accordance with the warp vectors. Additionally or alternatively, the electronic device 102 may apply a warping map from the dynamic warping. Additionally or alternatively, the electronic device 102 may combine a warped image and an original image. It should be noted that one or more steps and/or aspects of the method 200 may be optional and/or may be performed in different orders. In some approaches, the electronic device 102 may use disparity vectors to warp one or more individual images, and may combine the warped images after performing color correction (e.g., color synchronization).

It should be noted that one or more steps of the method 200 may be rearranged and/or omitted in some configurations. For example, predicting 206 the entrance time may be omitted in some configurations, and determining 208 the warp vectors may be based on the predicted disparity.

Figure 3:
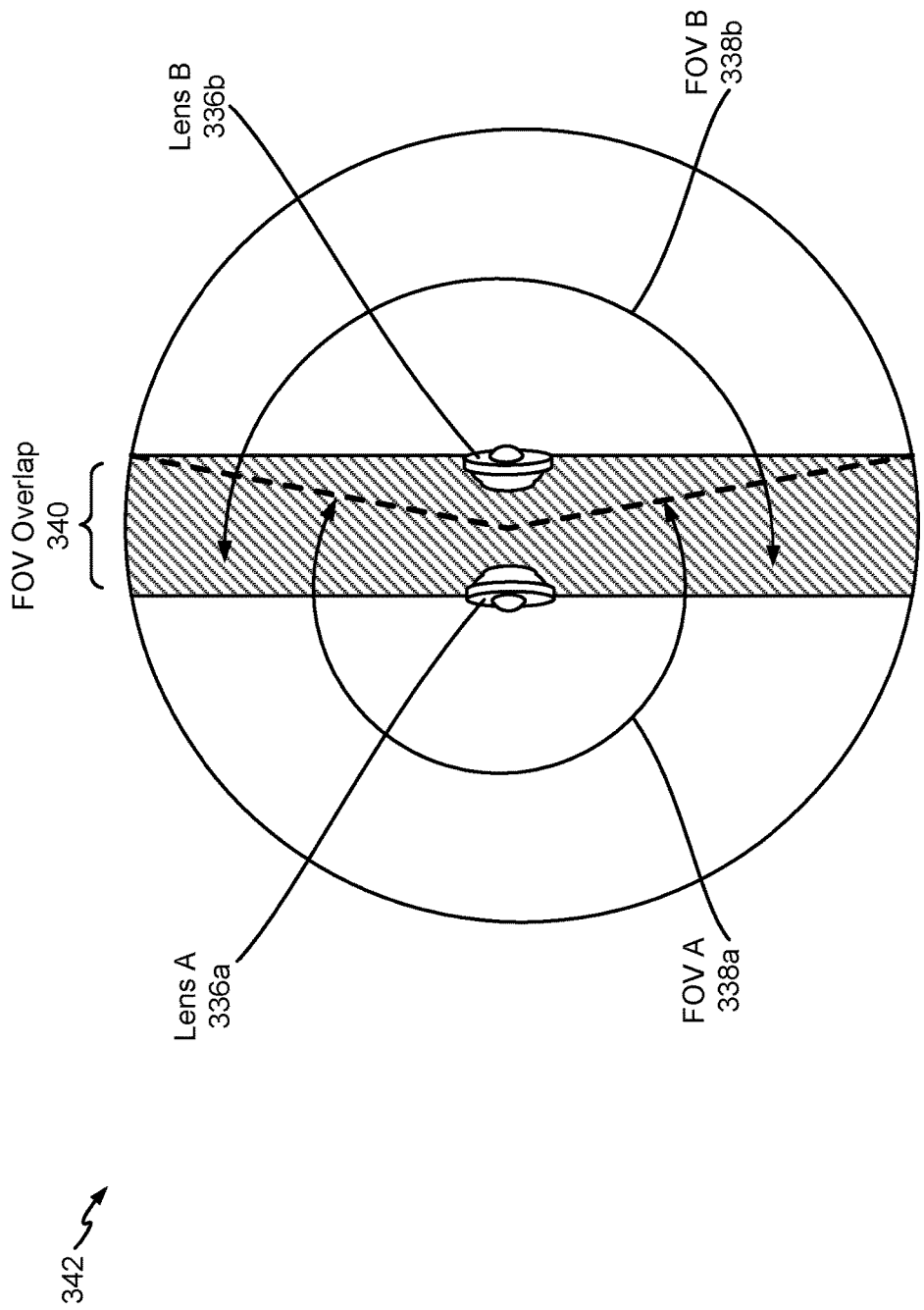
FIG. 3 is a diagram illustrating an example of dual fisheye lenses.

FIG. 3 is a diagram illustrating an example 342 of dual fisheye lenses 336a-b. In particular, FIG. 3 illustrates a dual fisheye arrangement that may be implemented in some configurations of the systems and methods disclosed herein. In this example, fisheye lens A 336a and fisheye lens B 336b face approximately opposite directions. Fisheye lens A 336a has FOV A 338a and fisheye lens B 336b has FOV B. As can be observed, the fisheye lenses 336a-b may have FOVs 338a-b that are greater than 180 degrees. The FOVs 338a-b may have a FOV overlap 340 that allows capture of overlapping images.

Figure 4:
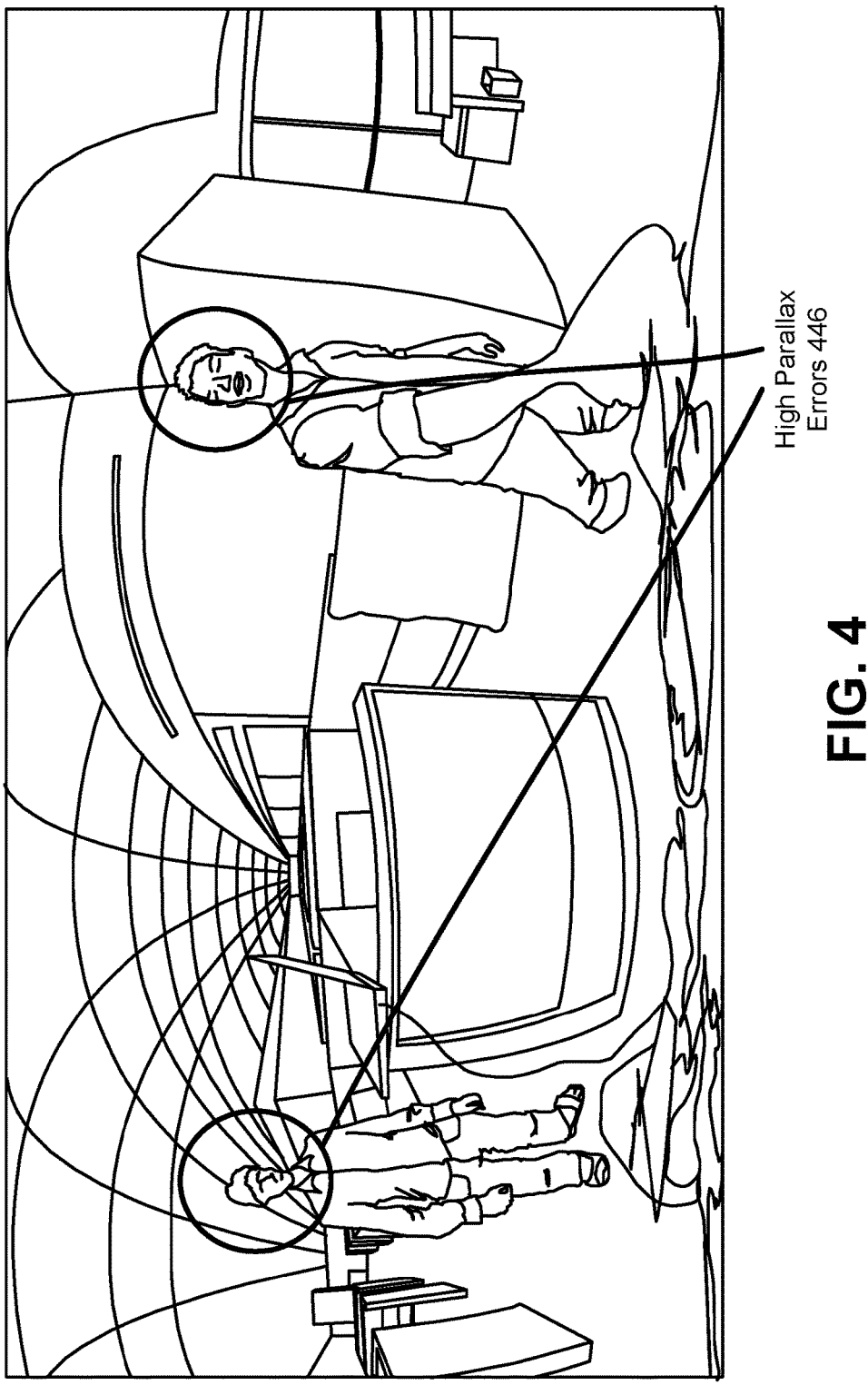
FIG. 4 illustrates an example of high parallax errors.

FIG. 4 illustrates an example 444 of high parallax errors 446. In particular, FIG. 4 illustrates a static seam-based stitching output (in the equi-rectangular domain). As shown in FIG. 4, high parallax errors 446 may occur in the overlapping region between images from different fisheye cameras. Specifically, high parallax errors 446 occur due to the subjects being close to the camera. For instance, there is a greater disparity in the position of the subjects between cameras due to the closeness of the subjects. It may also be observed that the background does not exhibit as much disparity. Some configurations of the systems and methods disclosed herein may beneficially reduce and/or avoid parallax errors.

Figure 5:
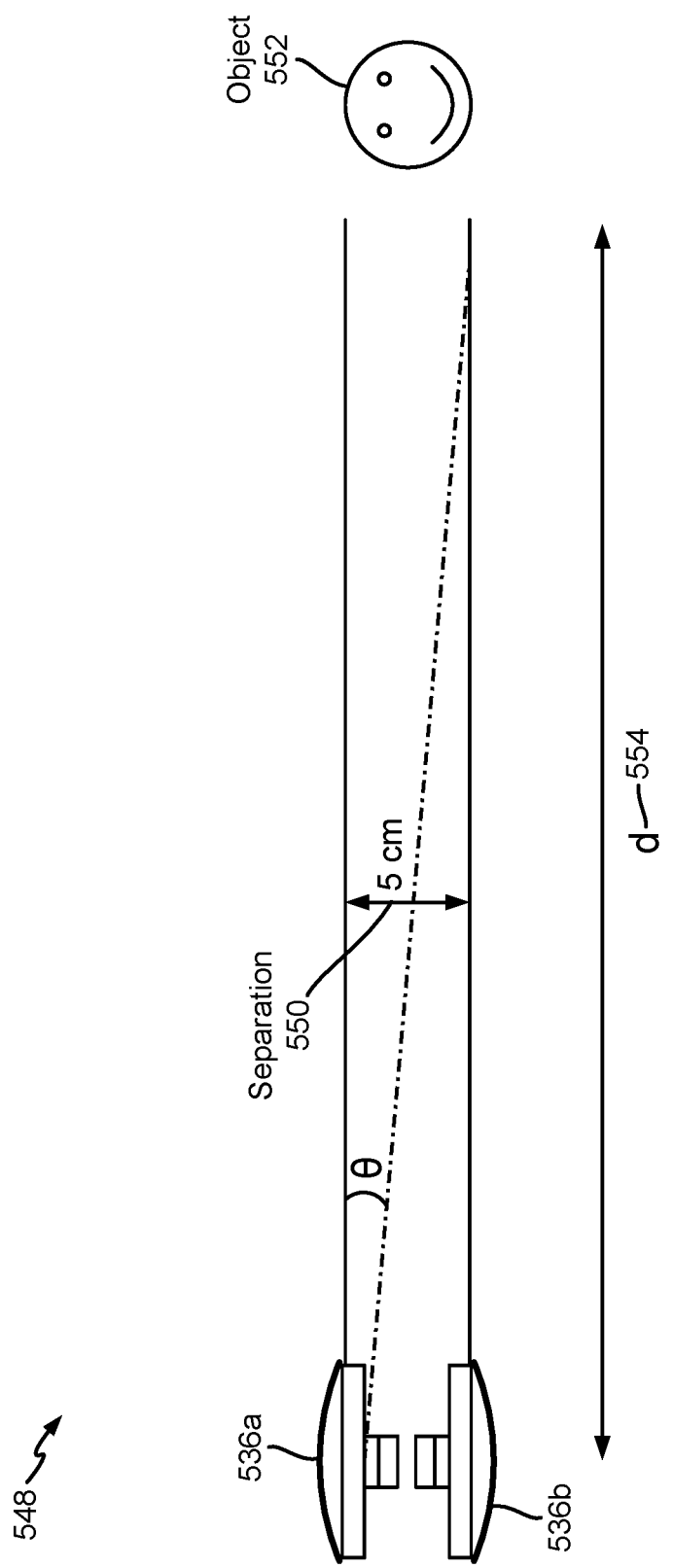
FIG. 5 is a diagram illustrating an example of parallax computation.

FIG. 5 is a diagram illustrating an example 548 of parallax computation. Parallax may occur because the same object 552 may appear at different image locations in different cameras due to an optical center difference. In particular, a pair of lenses 536a-b may have optical centers that are separated by an amount of separation 550. In the example 548 in FIG. 5, the separation 550 is 5 centimeters (cm). An object 552 may be positioned at a distance d 554 from the lens center. Lens B 536b may observe the object 552 at 180 degrees, while lens A 536a may observe the object 552 at 180 degrees plus θ. Equations (1)-(3) illustrate some relationships that may be utilized in parallax computation.

$$\tan\theta = \frac{5}{d} \quad (1)$$

$$R = f*\theta; f = 730 \text{ pixels} \quad (2)$$

$$\Delta_r = 730*\tan^{-1}\left(\frac{5}{d}\right) \quad (3)$$

In Equations (1)-(3), θ is an angle relative to a lens plane, R is a distance from an image center (where an object appears, for example), f is a focal length, $\Delta_r$ is a parallax error (in pixels for example), and d is a distance between the lens center (e.g., lens center axis) and the object. The parallax error may indicate a distance in pixels between the positions of the object in each image. It should be noted that although a focal length f=730 pixels is used in this example, different values may be used (for different lenses with different focal lengths, for instance). It should also be noted that other separation distances other than 5 cm may be implemented. Table (1) illustrates some examples of parallax error.

TABLE 1

| Camera Separation | Object Distance | Parallax Error |
|---|---|---|
| 5 cm | 36 meters (m) | 1 pixel |
| 5 cm | 1 m | 36 pixels |
| 1 cm | 7.2 m | 1 pixel |

Figure 6:
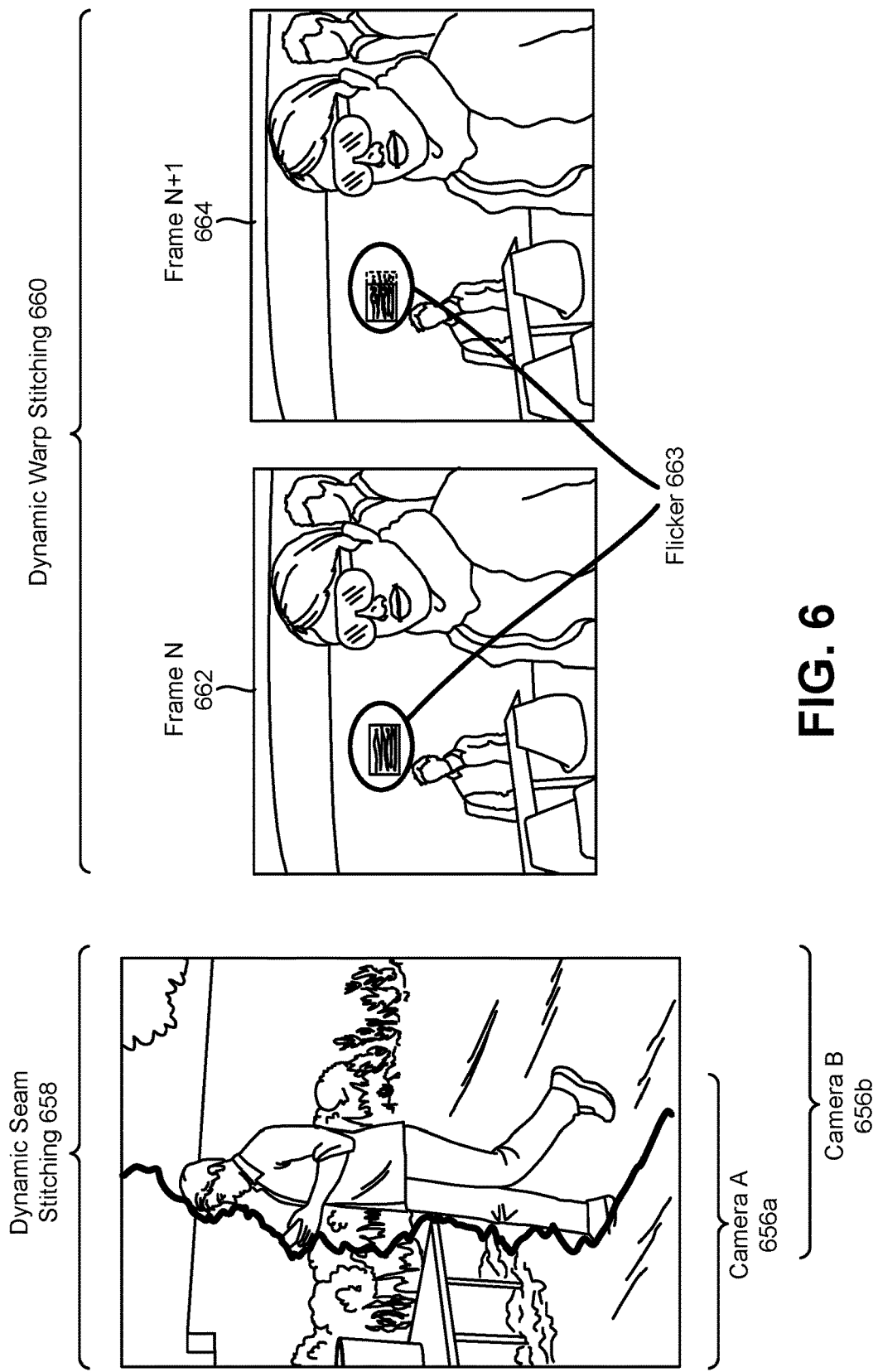
FIG. 6 is a diagram illustrating examples of temporal distortion that may occur with dynamic seam stitching and/or dynamic warp stitching.

FIG. 6 is a diagram illustrating examples of temporal distortion that may occur with dynamic seam stitching 658 and/or dynamic warp stitching 660. Temporal distortions may not observed when only static images are stitched. However, temporal artifacts may significantly impact perceived video quality.

In dynamic seam stitching, A seam between the images (e.g., between the overlapping regions) may be determined as illustrated in the dynamic seam stitching example 658. For example, an image may be captured by camera A 656a and another image may be captured by camera B 656b. A seam may be determined that avoids going (e.g., cutting, crossing, etc.) through foreground regions (e.g., objects in the foreground of an image). The images (e.g., the overlapping regions) may be blended based on the seam. For example, alpha blending may be performed on the images (e.g., overlapping regions) based on the dynamic seam. For instance, the images may be blended (e.g., averaged, merged, summed, etc.) in a blending region that borders the dynamic seam. The example of dynamic seam stitching 658 illustrates an example of a seam between images. Temporal distortions may be seen in dynamic seam stitching. For example, the image in the overlapping region may flicker due to seam movement.

An example of dynamic warp stitching 660 is also illustrated in FIG. 6. In particular, frame N 661 and frame N+1 are illustrated. Temporal distortions may be observed in dynamic warp stitching. For instance, large changes in warp vectors across consecutive frames may cause flicker 663 in the overlapping region.

Figure 7:
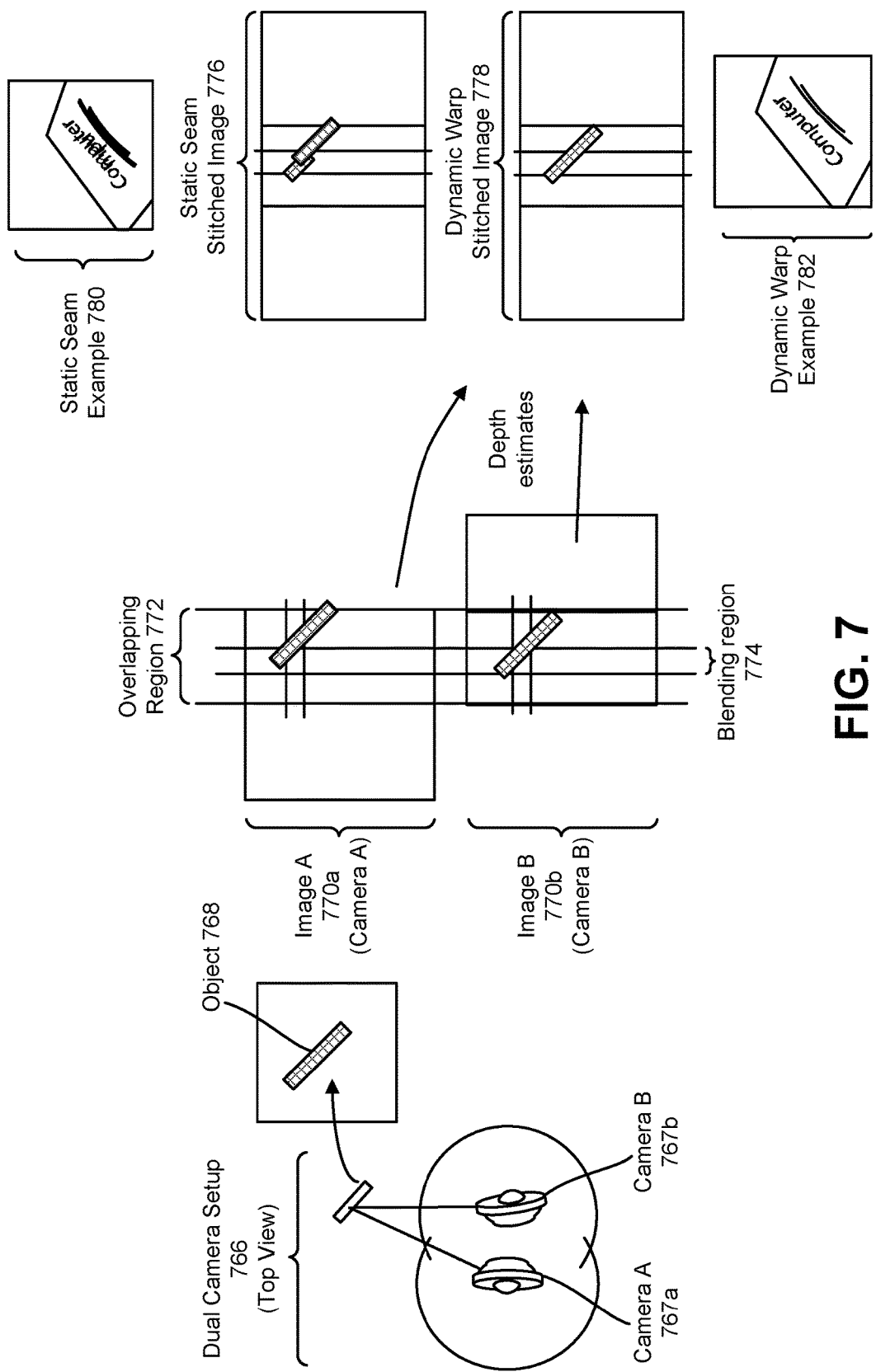
FIG. 7 is a diagram illustrating an example of static seam stitching versus dynamic warp stitching.

FIG. 7 is a diagram illustrating an example of static seam stitching versus dynamic warp stitching. FIG. 7 illustrates an example of how dynamic warp stitching may be beneficial. In particular, FIG. 7 illustrates an example of a dual camera setup 766 (top view). For example, the dual camera setup 766 may include camera A 767a (e.g., a left camera) and camera B 767b (e.g., a right camera). As illustrated, an object 768 may be observed from both cameras. Image A 770a (e.g., a left camera image) may correspond to camera A 767a and image B 770b (e.g., a right camera image) may correspond to camera B 767b. FIG. 7 illustrates an overlapping region 772 between image A 770a and image B 770b. The overlapping region 772 may be a region that is observable by both cameras. FIG. 7 also illustrates a blending region 774 between image A 770a and image B 770b. The blending region 774 may be a region within which blending may be performed. For example, some or all image data (e.g., pixel data) in the blending region 774 may be added, averaged, and/or otherwise combined. In some configurations, the blending region 774 may be a subset of the overlapping region 772. In some approaches, image A 770a and image B 770b may be transformed images (e.g., rectangular images that are the result of transforming wide-angle images from wide angle cameras).

As can be observed in FIG. 7, the object 768 may appear at different positions in image A 770a and image B 770b, due to the different placements of camera A and camera B in the dual camera setup 766. If static stitching is applied to image A 770a and image B 770b, a static seam stitched image 776 (e.g., static seam stitched output) may result. As can be observed, an artifact may occur in the blending region of the static seam stitched image 776. A static seam example 780 is illustrated, where an artifact occurs where text from two images is blended.

Dynamic warp stitching may be beneficial in some scenarios. As illustrated in FIG. 7, depth estimates (e.g., row level depth estimates) may be determined from image A 770a and image B 770b. The depth estimates (and/or disparities) may be utilized to produce a dynamic warped stitched image 778 (e.g., dynamic warp stitched output). As can be observed, using dynamic warp stitching may reduce and/or avoid artifacts in the blending region in some scenarios. A dynamic warp example 782 is illustrated, where the text from two images does not appear distorted.

Figure 8:
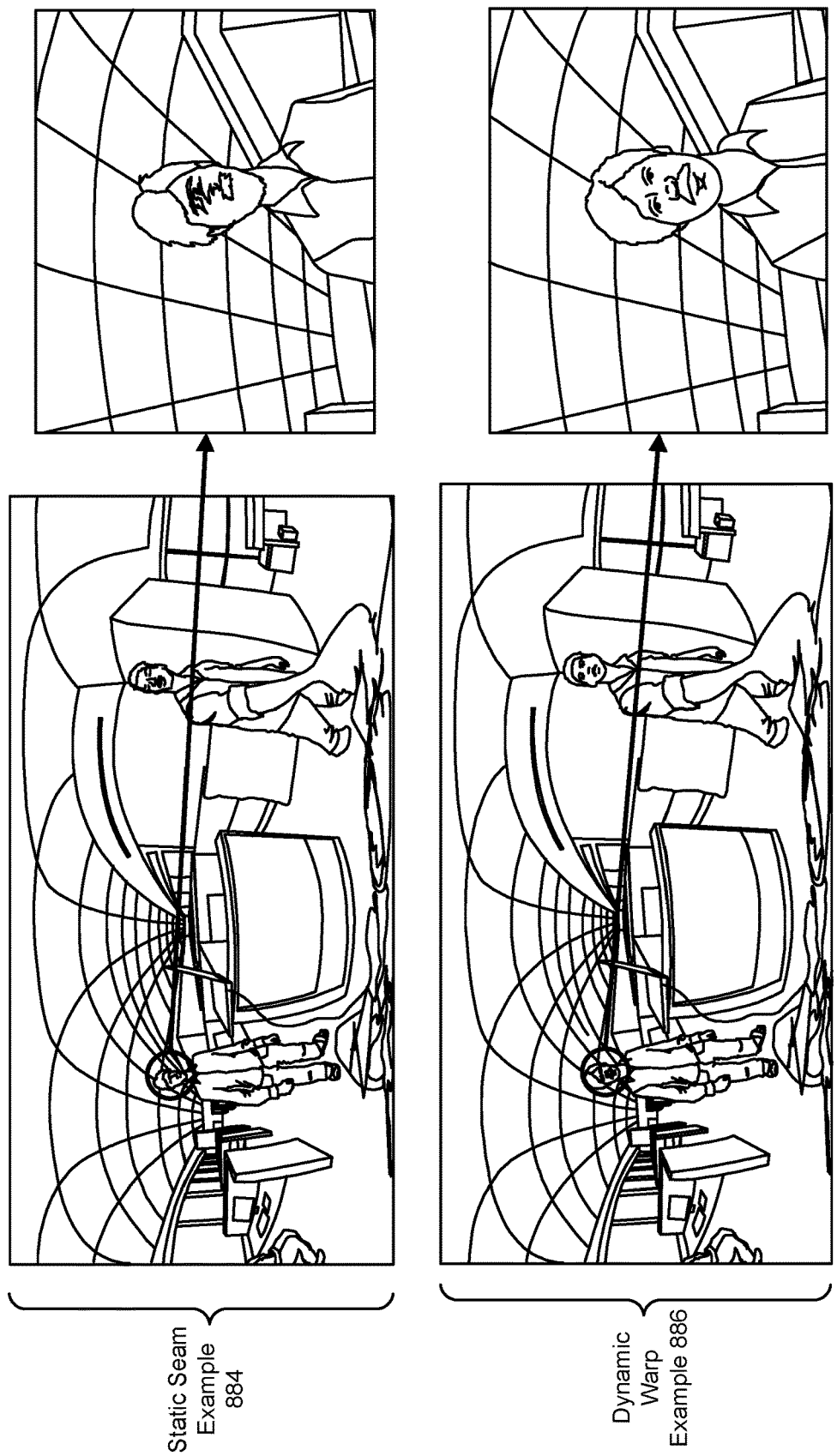
FIG. 8 is a diagram illustrating a static seam example and a dynamic warp example.

FIG. 8 is a diagram illustrating a static seam example 884 and a dynamic warp example 886. As can be observed static seam stitching may produce artifacts in a blending region between images as shown in the static seam example 884.

A dynamic warp technique (e.g., dynamic warp stitching) may beneficially reduce and/or avoid artifacts in a blending region in some scenarios. As illustrated in the dynamic warp example 886, artifacts in a blending region between images are reduced and/or avoided. In particular, the faces in the blending regions do not appear distorted in the dynamic warp example 886, whereas the faces in the blending regions of the static seam example 884 exhibit artifacts.

Figure 9:
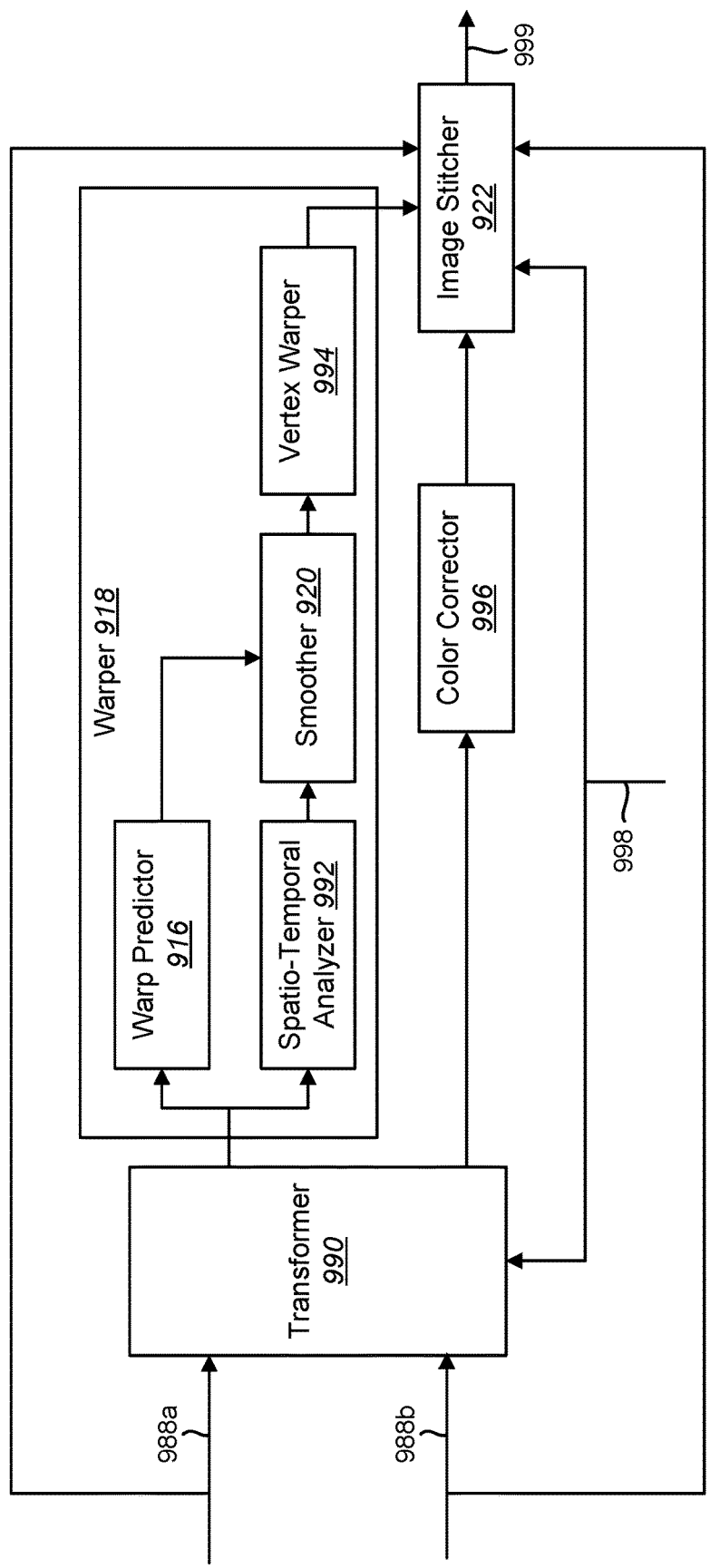
FIG. 9 is a block diagram illustrating an example of some components and/or elements that may be implemented in some configurations of the systems and methods disclosed herein.

FIG. 9 is a block diagram illustrating an example of some components and/or elements that may be implemented in some configurations of the systems and methods disclosed herein. For example, one or more of the elements described in connection with FIG. 9 (e.g., transformer 990, warper 918, warp predictor 916, spatio-temporal analyzer 992, smoother 920, vertex warper 994, color corrector 996, and/or image stitcher 922) may be implemented in the electronic device 102 described in connection with FIG. 1 and/or may be one or more examples of corresponding elements described in connection with FIG. 1. FIG. 9 illustrates an example of a configuration for stitching fisheye images (e.g., videos) with temporally consistent stitching in the overlapping region.

In FIG. 9, image A 988a and image B 988b may be provided to a transformer 990 and/or to an image stitcher 922. In some configurations, the images 988a-b may be wide-angle images (e.g., fisheye camera images). The images 988a-b may include overlapping regions (e.g., a region in each image that overlaps with the other image). An example of overlapping regions of fisheye images is given in connection with FIG. 10.

The transformer 990 may transform the overlapping regions into transformed images (e.g., another image format). For example, the transformer 990 may transform curved overlapping regions of the images 988a-b into rectangular images. For instance, the transformer 990 may transform the curved overlapping regions of the images 988a-b into rectangular images using a geometrical transformation. The transformed (e.g., rectangular) images may be computed only in one or more overlapping regions of the images in some approaches. In some configurations, one or more overlapping regions may be determined during calibration. For instance, the size and/or location of the overlapping region(s) may be determined using a procedure during calibration. Calibration parameters 998 may be provided to the transformer 990 to identify the overlapping region(s). Accordingly, the transformation may only be applied (e.g., determined, computed, etc.) in the overlapping region(s). In some configurations, the rectangular images may be referred to as "pencil images."

The transformed images may be provided to the color corrector 996. The color corrector 996 may perform color correction. For example, the color corrector 996 may alter the color of one or more of the images in order to match the color between the images. In some configurations, the color correction may be gamma-based color correction. In some approaches, performing color correction may be based on the disparity measure. For example, if the disparity measure indicates that a nearby object appears in the one or more of the images (e.g., sub-regions of the rectangular images), the color corrector 996 may ignore the area(s) (e.g., set of pixels, rows and/or columns, etc.) occupied by the objects in computing the color correction. Color correction factors and/or color corrected images may be provided to the image stitcher 922.

The transformed images may be provided to the warper 918. For example, the transformed images may be provided to the warp predictor 916 and the spatio-temporal analyzer 992. The warp predictor 916 may predict one or more warping parameters based on the transformed images. For example, the warp predictor 916 may predict one or more disparities (e.g., disparity vectors, disparity values, etc.) of the transformed images (e.g., of a moving object). Additionally or alternatively, the warp predictor 916 may predict one or more depths of the transformed images (e.g., of a moving object). Disparity and/or depth prediction may be performed based on object size, missing feature detection, and/or depth detection. Additionally or alternatively, the warp predictor 916 may predict one or more entrance times (e.g., a time for the moving object to enter an overlapping region and/or a time for the moving object to enter a blending region, etc.). Entrance time prediction may be performed based on object tracking. In some configurations, the warp predictor 916 may be an example of the warp predictor 116 described in connection with FIG. 1. A warp predictor 916 output (e.g., disparities) may be provided to the smoother 920.

The spatio-temporal analyzer 992 may perform spatio-temporal analysis of the transformed images. For example, the spatio-temporal analyzer 992 may determine one or more disparities (e.g., disparity vectors, disparity values, etc.). In some configurations, the spatio-temporal analyzer 992 may determine one or more disparity vectors for each row of one or more of the transformed images. The disparities (e.g., disparity vector(s), disparity value(s), etc.) may be provided to the smoother 920. In some approaches, spatio-temporal analysis may include detecting corresponding points between images to determine a disparity and/or depth.

The smoother 920 may perform smoothing and/or adaptive look ahead based on disparity(ies). For example, the smoother 920 may maintain and/or access a look ahead disparity buffer. In some configurations, the look ahead disparity buffer may be stored in memory. The look ahead disparity buffer may be filled with disparity vectors from the warp predictor 916. The disparity vectors (e.g., values) may be used to ramp up the applied disparity with a foreground object is about to enter the overlapping region. The smoother 920 may perform filtering and/or averaging based on two or more disparities (in the disparity buffer, for instance). For example, the smoother 920 may determine whether to apply a causal filter or a non-causal filter based on a look ahead disparity (from the warp predictor 916, for example) and a current disparity (from the spatio-temporal analyzer 992, for example). The smoother 920 may produce one or more warp vectors (e.g., a set of warp vectors for each row of a transformed image). In some approaches, the applied disparity (e.g., ramping up applied disparity) may be based on the predicted entrance time.

The warp vectors may be provided to the vertex warper 994. The vertex warper 994 may warp one or more vertex points based on the disparity vectors (e.g., using the warp vectors). For example, the vertex warper 994 may warp a set of vertex points to generate a warped vertex map. The warped vertex map may be provided to the image stitcher 922.

The image stitcher 922 may warp and/or stitch the images 988a-b based on the warped vertex map. For example, the image stitcher 922 may apply the warped vertex map to produce a stitched image (e.g., output equi-rectangular image). In some configuration, the image stitcher 922 may perform the image stitching on a graphics processing unit (GPU).

In some configurations, the image stitcher 922 may optionally apply one or more maps to compute equi-rectangular images. For example, the electronic device 102 may determine and/or maintain one or more maps between original images (e.g., wide-angle images, overlapping regions of wide-angle images, etc.) and transformed images (e.g., rectangular images). The image stitcher 922 may apply the map(s) in order to apply the warping and/or stitching to the original images. In some configurations, a stitched image may be computed in the equi-rectangular domain. In approaches where a transformation is not utilized and/or implemented, the electronic device 102 may perform warping directly on the original image(s) 988*a-b* (e.g., wide-angle images, etc.).

The image stitcher 922 may output the stitched image 999 (e.g., equi-rectangular image). For example, the image stitcher 922 may store the stitched image and/or may transmit the stitched image.

Figure 10:
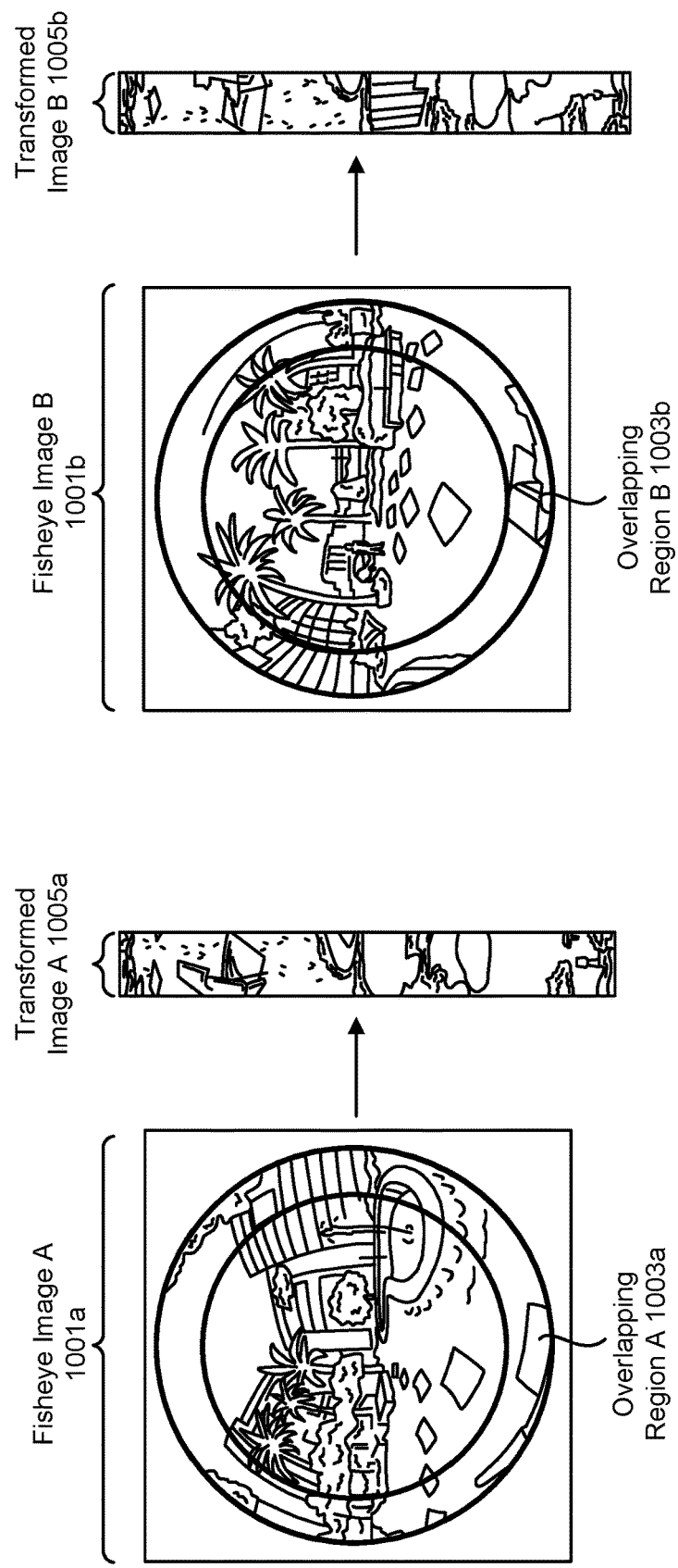
FIG. 10 is a diagram illustrating an example of fisheye images and transformed images.

FIG. 10 is a diagram illustrating an example of fisheye images 1001*a-b* and transformed images 1005*a-b*. In particular, FIG. 10 illustrates examples of a transformation of fisheye images 1001*a-b*. In some configurations, the transformation described in connection with FIG. 10 may be performed by the electronic device 102 described in connection with FIG. 1 and/or the transformer 990 described in connection with FIG. 9.

As illustrated in FIG. 10, fisheye image A 1001*a* may include overlapping region A 1003*a* and fisheye image B 1001*b* may include overlapping region B 1003*b*. The overlapping regions 1003*a-b* may be portions of the respective fisheye images 1001*a-b* where the fisheye images 1001*a-b* (e.g., cameras) fields of view overlap.

In some configurations, each of the fisheye images 1001*a-b* may be transformed to produce respective transformed images 1005*a-b*. For example, a transform may be applied to overlapping region A 1003*a* to produce the rectangular transformed image A 1005*a*. A transform may be similarly applied to overlapping region B 1003*b* to produce the rectangular transformed image B 1005*b*. In some configurations, one or more of the functions and/or operations (e.g., warp prediction, smoothing, dynamic warping, etc.) described herein may be applied to the fisheye images 1001*a-b* and/or transformed images 1005*a-b*.

Figure 11:
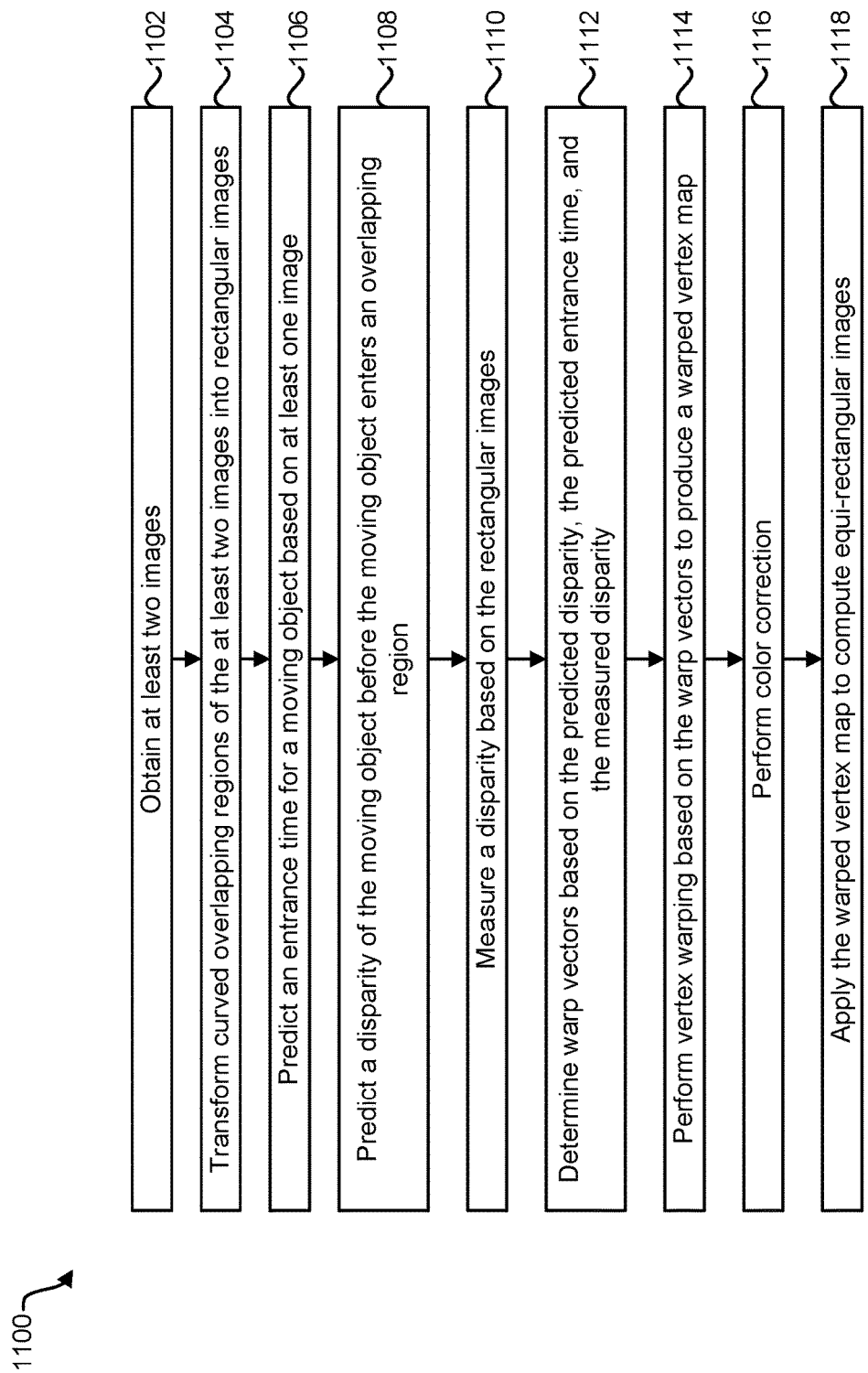
FIG. 11 is a flow diagram illustrating a more specific configuration of a method for image stitching.

FIG. 11 is a flow diagram illustrating a more specific configuration of a method 1100 for image stitching. The method 1100 may be performed by the electronic device 102, for example. The electronic device 102 may obtain 1102 at least two images. This may be accomplished as described in relation to one or more of FIGS. 1-2. For example, the electronic device 102 may capture one or more wide-angle images (e.g., fisheye camera images) and/or may receive one or more wide-angle images from another device. Each of the images may include at least one overlapping region. For example, overlapping regions may be located on the periphery of the images (e.g., within an outer ring in a wide-angle image).

The electronic device 102 may transform 1104 curved overlapping regions of the at least two images into rectangular images. This may be accomplished as described in relation to one or more of FIGS. 1 and 9-10. For example, the electronic device 102 may transform 1104 the curved overlapping regions of the at least two images into rectangular images using a geometrical transformation. The rectangular images may be computed only in one or more overlapping regions of the images in some approaches. In some configurations, one or more overlapping regions may be determined during calibration. For instance, the size and/or location of the overlapping region(s) may be determined using a procedure during calibration. Accordingly, the transformation may only be applied in the overlapping region(s). In some configurations, the rectangular images may be referred to as "pencil images."

The electronic device 102 may predict 1106 an entrance time for a moving object based on at least one image. This may be accomplished as described in connection with FIG. 1. For example, the electronic device 102 may compare the position of an object in a current image (e.g., current frame) with the position of the object in a previous image (e.g., previous frame) to determine the entrance time. In some approaches, the electronic device 102 may track the moving object over frames and determine a time at which the moving object is anticipated to enter an overlapping region (and/or a blending region) based on the velocity of the moving object.

The electronic device 102 may predict 1108 a disparity (and/or a depth) of the moving object before the moving object enters an overlapping region. This may be accomplished as described in connection with FIG. 1. For example, the electronic device 102 may determine a disparity (and/or a depth) based on depth detection, object size, and/or missing feature detection.

The electronic device 102 may measure 1110 a disparity (and/or depth) based on the rectangular images. This may be accomplished as described in connection with FIG. 1. For example, the electronic device 102 may compare one of the rectangular images (e.g., a first rectangular image) with another rectangular image (e.g., a second rectangular image) to determine the disparity (and/or depth). In some approaches, the electronic device 102 may perform feature detection (e.g., corner detection, keypoint detection, etc.) in order to determine the disparity measure. Detected features may be compared between the rectangular images to determine vectors (e.g., distances) between the features. The vectors may be indicate and/or may be utilized to determine 1110 the disparity (and/or depth).

The electronic device 102 may determine 1112 warp vectors based on the predicted disparity, the predicted entrance time, and/or the measured disparity. This may be accomplished as described in connection with FIG. 1. For example, the electronic device 102 may determine a set of warping vectors over a set of frames to gradually warp at least one image from the measured disparity to the predicted disparity at the predicted entrance time. In some configurations, the warp vectors may be based on a warping ramp and/or incremental warping steps over time. In some configurations, determining 1112 the warp vectors may include smoothing. For example, the electronic device 102 may apply smoothing (e.g., a non-causal filter or a causal filter) over a set of frames based on at least two disparities (e.g., a current frame disparity and a subsequent frame disparity).

The electronic device 102 may perform 1114 vertex warping based on the warp vectors to produce a warped vertex map. This may be accomplished as described in connection with FIG. 9. For example, the electronic device 102 may apply the warp vectors to the rectangular images (e.g., to one or more vertices in the rectangular images) to determine the warped vertex map.

In some configurations, the electronic device 102 may perform 1116 color correction. For example, the electronic device 102 may alter the color of one or more of the images in order to match the color between the images. In some configurations, the color correction may be gamma-based color correction. For instance, gamma coefficients may be computed from the overlapping regions (e.g., rectangular images) to equalize the color and brightness of the images (e.g., two fisheye images). Gamma values (e.g., coefficients) may be determined using a mean of the overlapping regions (e.g., rectangular images). Blindly computing the mean of the overlapping regions may lead to wrong gamma values as close-by objects can be visible in only one of the cameras in some cases. In some approaches, the electronic device 102 may utilize a threshold on the measured disparity (e.g., disparity map) to prune out the nearby objects before computing the mean. This may lead to better mean correspondence across the two overlapping regions and hence, better color and brightness equalization.

In some configurations, color correction (e.g., a color correction algorithm) may be performed as follows. Overlapping regions from two or more images may be utilized. For example, the overlapping regions may be rectangular images transformed from curved overlapping regions of fisheye camera images. The electronic device 102 may calculate gamma coefficients for Y and linear coefficients for Cb/Cr to equalize the means of the histograms of three channels in the overlapping regions. This may produce a gamma map for the Y channel for two images (e.g., overlapping regions, rectangular images, etc.). A similar procedure (e.g., input to output map) may be performed for chroma channels for the two images (e.g., overlapping regions, rectangular images, etc.). The mappings may be utilized to equalize the brightness and colors of two images while stitching.

In some approaches, the electronic device 102 may perform color correction (e.g., a gamma computation) using the measured disparity (e.g., disparity map). For example, means may be computed excluding one or more nearby objects. Nearby objects may be indicated by the measured disparity (e.g., large disparity values, disparity values above a threshold, etc.).

The electronic device 102 may optionally apply 1118 the warped vertex map to compute equi-rectangular images. For example, the electronic device 102 may determine and/or maintain one or more maps between original images (e.g., wide-angle images, overlapping regions of wide-angle images, etc.) and transformed images (e.g., rectangular images, sub-regions of rectangular images, etc.). The electronic device 102 may apply 1118 the map(s) in order to apply the selected stitching scheme(s) to the original images. In some configurations, stitched image may be computed in the equi-rectangular domain. For example, the electronic device 102 may stitch the equi-rectangular output in some approaches. It should be noted that other output formats may be additionally or alternatively used in the final stitching step. It should be noted that one or more steps and/or aspects of the method 1100 may be optional and/or may be performed in different orders.

Figure 12:
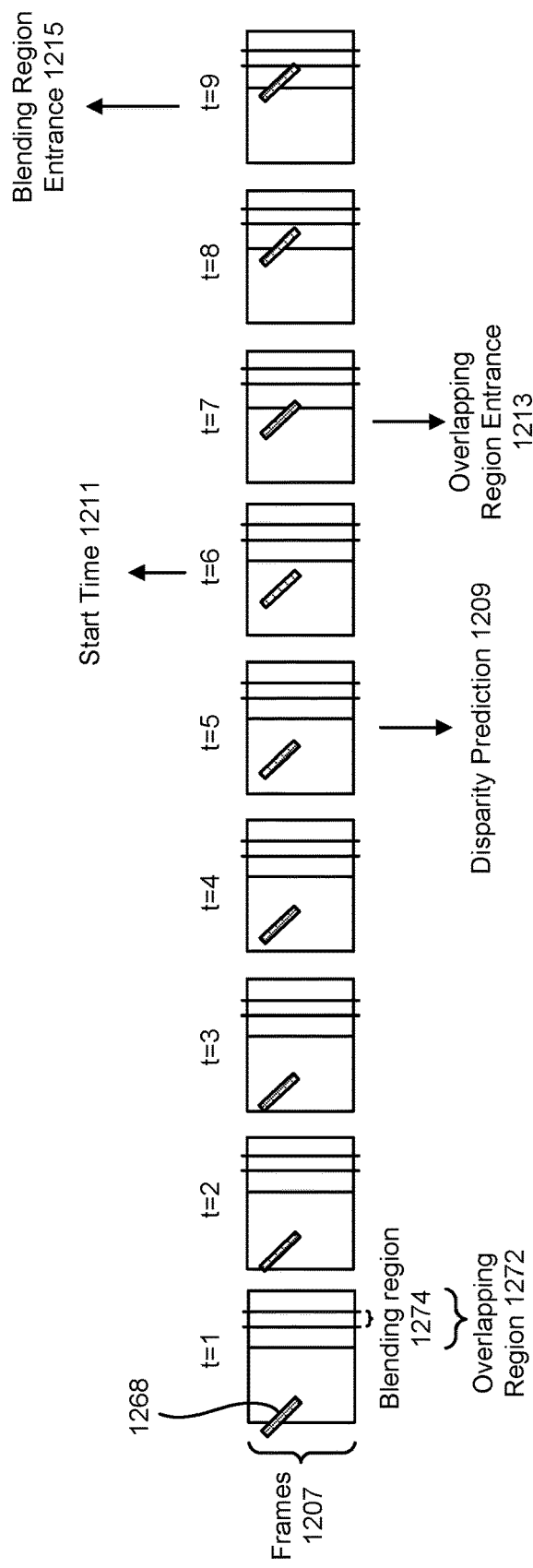
FIG. 12 is a diagram illustrating an example of warp prediction.

FIG. 12 is a diagram illustrating an example of warp prediction. For example, the warp prediction described herein may be performed in accordance with the example described in connection with FIG. 12 in some configurations. In particular, FIG. 12 illustrates a set of frames 1207 from time t=1 to time t=9, where a frame corresponds to each time. It should be noted that the systems and methods disclosed herein may be implemented with a variety of frame rates. The set of frames 1207 may come from one camera (e.g., one camera in a set of cameras). An overlapping region 1272 and a blending region 1274 of the frames 1207 are also illustrated. For example, each of the frames 1207 may overlap with a frame from another camera.

As illustrated in FIG. 12, a moving object 1268 moves from the left to the right in each of the frames 1207 over time. The moving object (e.g., foreground object) may be tracked using a tracking technique (e.g., optical flow) using a constant velocity model. The electronic device 102 may perform disparity prediction 1209 at t=5. For example, the electronic device 102 may capture depth before the object enters the overlapping region. In some approaches, the electronic device 102 may use a depth detector (e.g., a stereo depth camera, infrared time-of-flight (TOF) camera, radar, lidar, etc.) and/or may use an inference about the moving object 1268 (e.g., foreground object). For example, the electronic device 102 may determine (e.g., infer) the depth and/or disparity of the moving object 1268 based on the object size (e.g., bounding box size) and/or object type (e.g., face detection, human detection, etc.).

At time t=6, the electronic device 102 may start ramping up a disparity (e.g., warp vector(s)) and applying the warping to the overlapping region 1272. At time t=7, the moving object 1268 may enter 1213 overlapping region 1272. At time t=7, the electronic device 102 may continue ramping up the disparity (e.g., warp vector(s)). At time t=9, the moving object 1268 may enter 1215 the blending region, at which time the target disparity (e.g., predicted disparity) may be achieved. For example, the frame at t=9 may be warped to fully compensate for the disparity.

Figure 13:
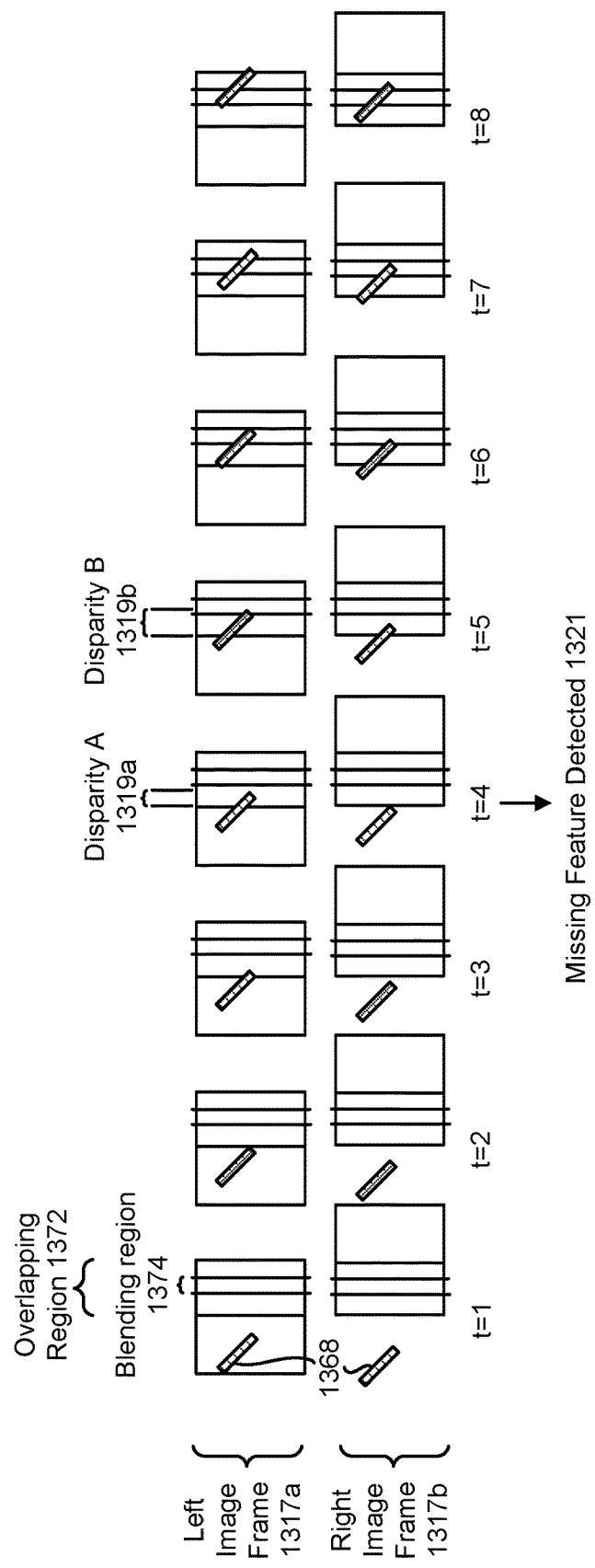
FIG. 13 is a diagram illustrating an example of warp prediction based on missing feature detection.

FIG. 13 is a diagram illustrating an example of warp prediction based on missing feature detection (e.g., missing feature matches). For example, the warp prediction described herein may be performed in accordance with the example described in connection with FIG. 13 in some configurations. In particular, FIG. 13 illustrates a set of left image frames 1317*a* and a set of right image frames 1317*b* from time t=1 to time t=8, where a pair of frames corresponds to each time. It should be noted that the systems and methods disclosed herein may be implemented with a variety of frame rates. The set of left image frames 1317*a* may come from one camera and the set of right image frames 1317*b* may come from another camera. An overlapping region 1372 and a blending region 1374 of the frames 1317*a-b* are also illustrated. For example, each of the left image frames 1317*a* may overlap with a right image frame 1317*b* at a time.

As illustrated in FIG. 13, a moving object 1368 moves from the left to the right in each of the frames 1317*a-b* over time. The electronic device 102 may detect 1321 a missing feature at t=4. For example, the electronic device 102 may determine that the moving object 1368 is visible in the left camera (but not the right camera, for instance) as the moving object 1368 begins to enter the overlapping region 1372. In some approaches, the electronic device 102 may start warping when a missing feature is detected. For example, the electronic device 102 may start warping at t=4 because the disparity may be at least disparity A 1319*a*. At time t=5, the electronic device 102 may continue ramping up a disparity (e.g., warp vector(s)) if disparity B 1319*b* is greater than disparity A 1319*a*.

Figure 14:
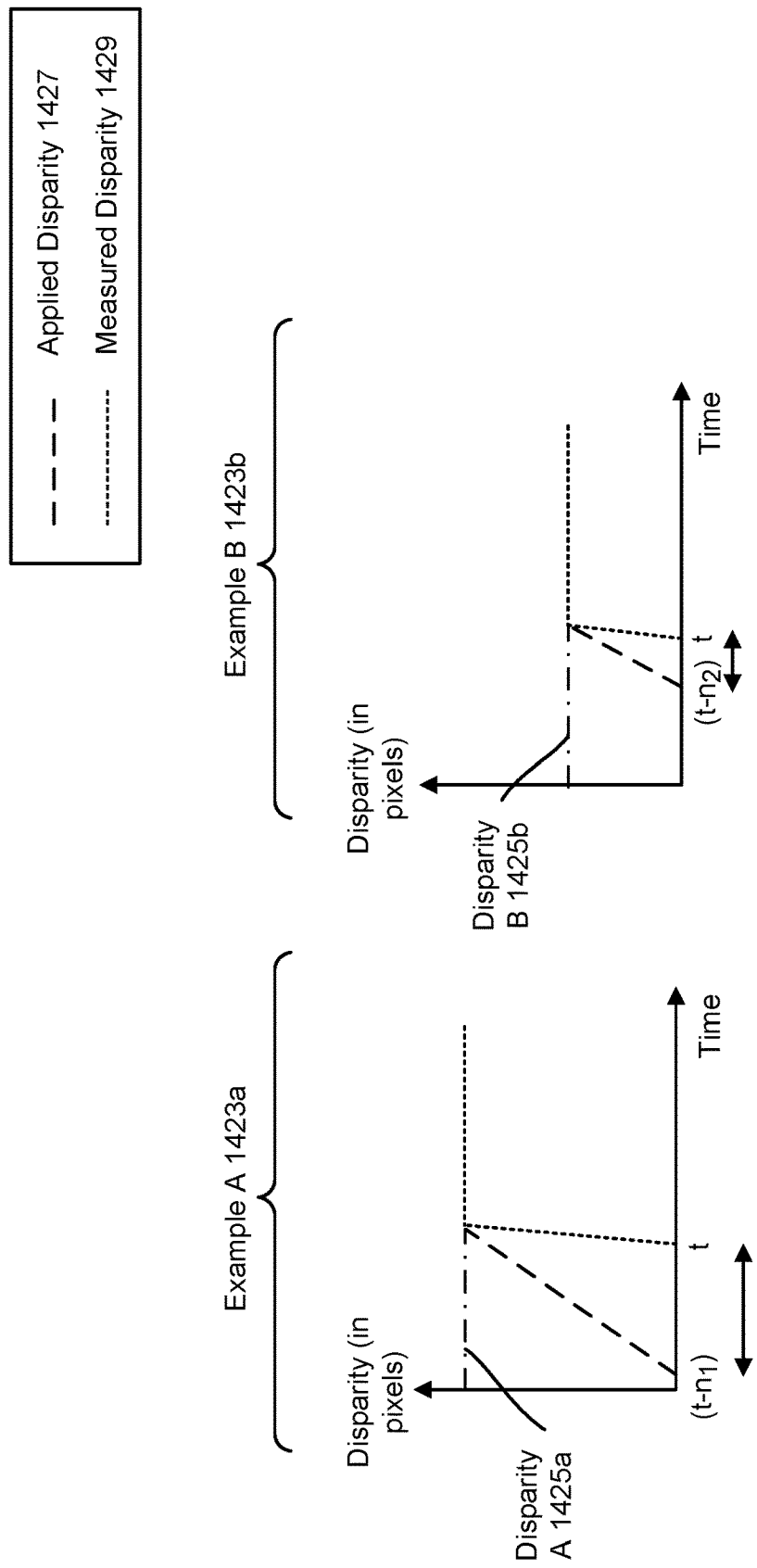
FIG. 14 is a diagram illustrating an example of adaptive warping in accordance with some configurations of the systems and methods disclosed herein.

FIG. 14 is a diagram illustrating an example of adaptive warping in accordance with some configurations of the systems and methods disclosed herein. In particular, FIG. 14 illustrates example A 1423*a* and example B 1423*b* of adaptive warping. In adaptive warping, for instance, the electronic device 102 may adaptively determine when to start applying disparity for a moving object (e.g., foreground object). The time to start applying disparity (e.g., applying warp vectors) may depend on the depth of the moving object from the camera(s).

Example A 1423a illustrates a graph in disparity (pixels) over time. As illustrated in example A 1423a, the applied disparity 1427 begins to ramp up at a time (t−$n_1$) before the measured disparity 1429 increases. For instance, disparity A 1425a may be a predicted disparity for a moving object and time t may be a predicted entrance time (for entering an overlapping region and/or a blending region, for example) for the moving object. Before the predicted entrance time, the electronic device 102 may begin ramping up the applied disparity 1427. For example, the electronic device 102 may determine and/or apply one or more warp vectors in accordance with a warping ramp (in accordance with the applied disparity 1427, for instance). In some approaches, the slope of the warping ramp may be predetermined and/or static. The electronic device 102 may start warping sooner for nearby objects (e.g., objects with higher disparity) compared to distant objects (e.g., objects with lower disparity).

Example B 1423b illustrates another graph in disparity (pixels) over time. As illustrated in example B 1423b, the applied disparity 1427 begins to ramp up at a time (t−$n_2$) before the measured disparity 1429 increases. For instance, disparity B 1425b may be a predicted disparity for a moving object and time t may be a predicted entrance time (for entering an overlapping region and/or a blending region, for example) for the moving object. Before the predicted entrance time, the electronic device 102 may begin ramping up the applied disparity 1427. For example, the electronic device 102 may determine and/or apply one or more warp vectors in accordance with a warping ramp (in accordance with the applied disparity 1427, for instance). In some approaches, the slope of the warping ramp may be predetermined and/or static. The electronic device 102 may start warping sooner for nearby objects (e.g., objects with higher disparity) compared to distant objects (e.g., objects with lower disparity). For instance, because disparity A 1425a is greater than disparity B 1425b, warping may begin sooner in example A 1423b compared to example B 1423b (e.g., disparity A>disparity B→$n_1$>$n_2$). For example, $n_1$ may be a greater amount of time than $n_2$, where $n_1$ and $n_2$ indicate amounts of time and/or numbers of frames.

As illustrated by FIG. 14, the warping start time (e.g., frame) may be determined based on the predicted disparity and the predicted entrance time. For instance, with a predetermined slope, a warping start time (e.g., t−$n_1$ or t−$n_2$) and/or a warping ramp may be determined by finding a line with the slope that intersects with the predicted disparity and predicted entrance time. For example, an intersection of the line with the current disparity (e.g., 0 or another disparity) may be the warp start time. The examples 1423a-b described in connection with FIG. 14 may assume that overlapping region background objects are at infinity (e.g., zero disparity) before the foreground object enters.

It should be noted that a look ahead buffer may be a function of depth. For example, $n_i$=f($D_i$), where $D_i$ is a disparity or depth.

Figure 15:
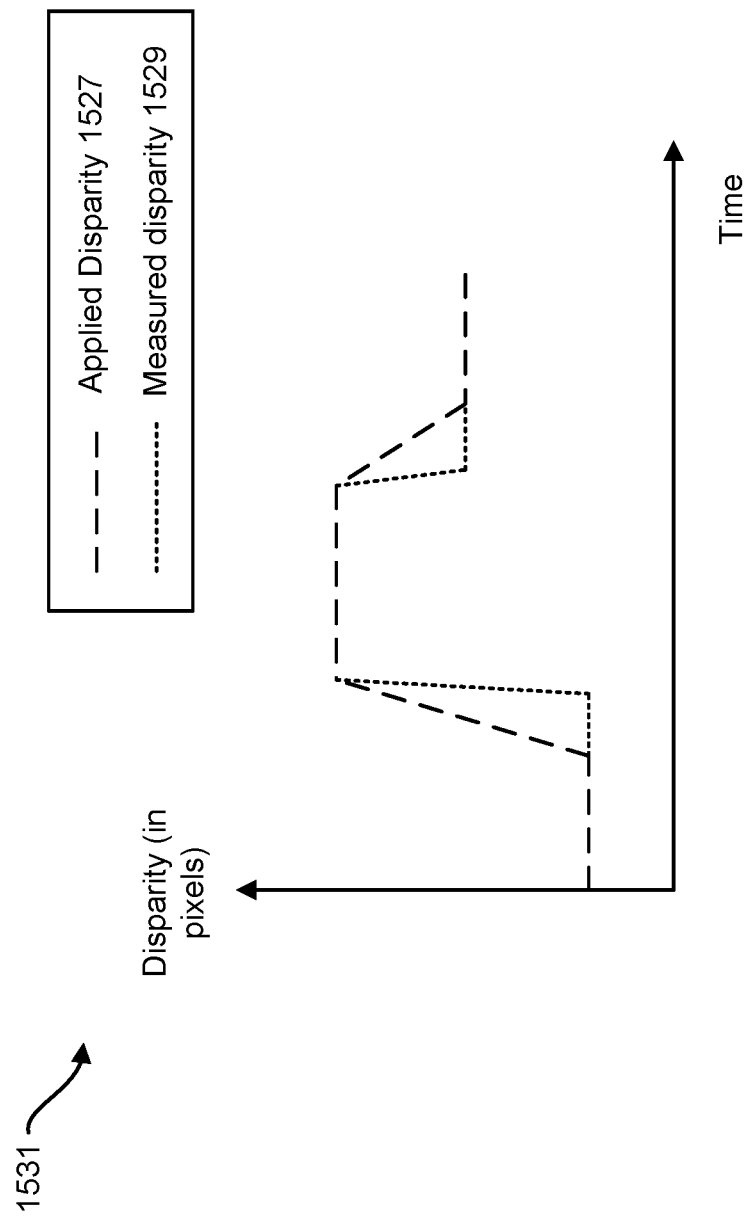
FIG. 15 is a diagram illustrating an example of temporal smoothing and look ahead in accordance with some configurations of the systems and methods disclosed herein.

FIG. 15 is a diagram illustrating an example 1531 of temporal smoothing and look ahead in accordance with some configurations of the systems and methods disclosed herein. In particular, FIG. 15 illustrates a graph in disparity (pixels) over time. As illustrated in the example 1531, the applied disparity 1527 begins to ramp up at a time before the measured disparity 1529 increases and then ramps down smoothly after the measured disparity 1529 decreases. In temporal smoothing and look ahead, a non-causal filter may be applied in a case that a subsequent or look ahead disparity is greater than a current disparity (and/or if a subsequent disparity minus the current disparity is greater than a threshold). For example, the electronic device 102 may average the current disparity with a subsequent (e.g., look ahead) disparity. A causal filter may be applied in a case that a subsequent or look ahead disparity is less than a current disparity (and/or if the current disparity minus the subsequent disparity is greater than a threshold). For example, the electronic device 102 may average the current disparity with a past disparity.

Figure 16:
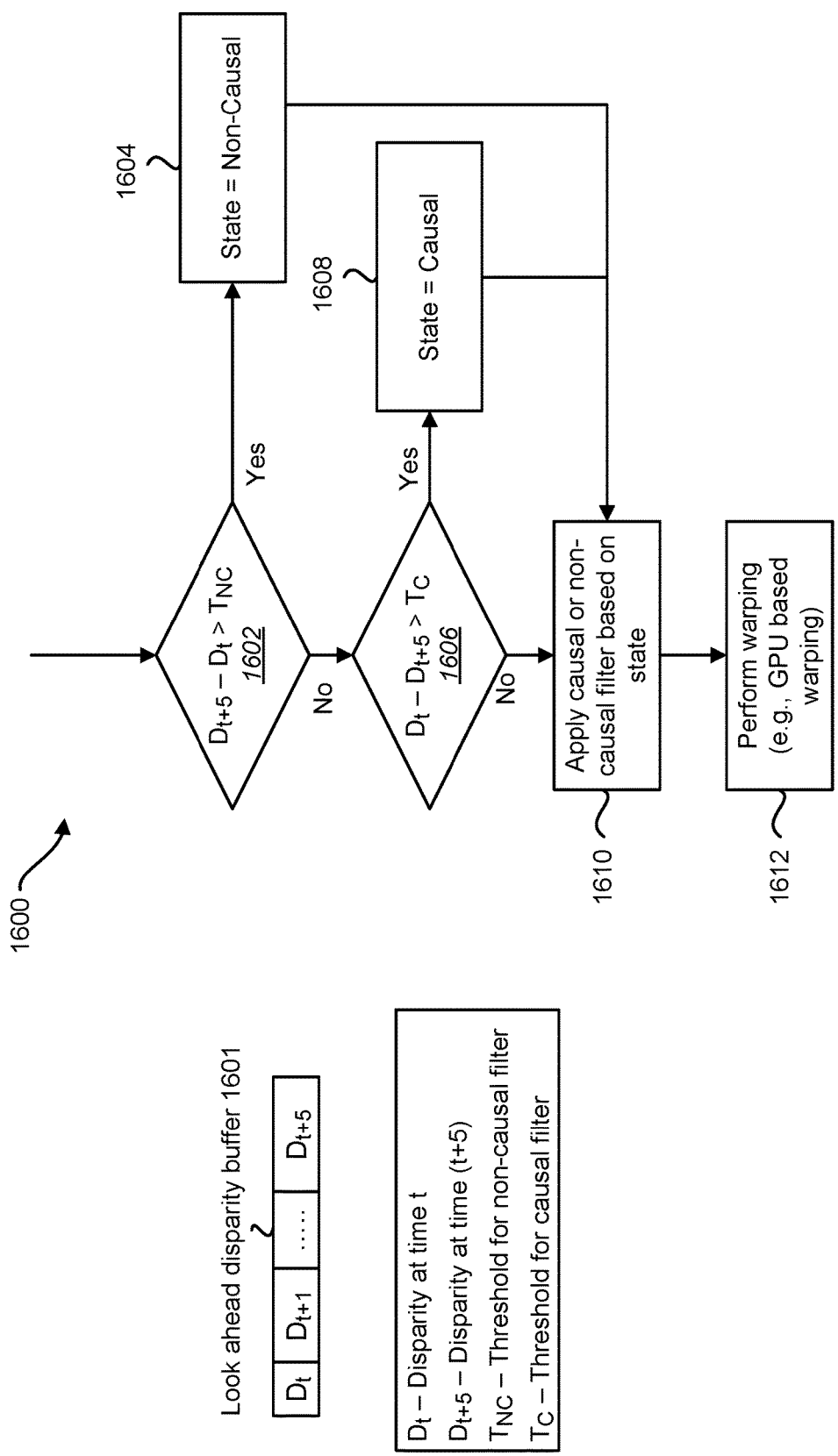
FIG. 16 is a diagram illustrating an example of a look ahead disparity buffer.

FIG. 16 is a diagram illustrating an example of a look ahead disparity buffer 1601 and an example of a method 1600 for temporal smoothing and look ahead. The method 1600 may be performed by the electronic device 102 described in connection with FIG. 1. For instance, the electronic device 102 may determine and/or maintain a look ahead disparity buffer 1601. In the example illustrated in FIG. 16, the look ahead disparity buffer ranges from $D_t$ to $D_{t+5}$, where $D_t$ is a disparity at time t, and $D_{t+5}$ is a disparity at time t+5 (e.g., the current frame plus 5 frames). It should be noted that in different configurations, more or fewer look ahead disparities may be determined and/or maintained.

The electronic device 102 may determine 1602 whether a difference between a subsequent disparity and the current disparity is greater than a threshold (e.g., $D_{t+5}-D_t>T_{NC}$, where $T_{NC}$ is a threshold for a non-causal filter). If the difference is greater than the threshold, the electronic device 102 may set 1604 a state (e.g., a look ahead and/or smoothing state) to non-causal. In some approaches, the current disparity may be determined based on patch matching. For example, a patch from one image (from a left camera, for instance) may be matched to a patch (from a right camera, for instance). The disparity (and/or depth) may be determined based on the distance between the matching patches.

If the difference is not greater than the threshold, the electronic device 102 may determine 1606 whether another difference between the current disparity and the subsequent disparity is greater than a threshold (e.g., $D_t-D_{t+5}>T_C$, where $T_C$ is a threshold for a causal filter). If the difference is greater than the threshold, the electronic device 102 may set 1608 a state (e.g., a look ahead and/or smoothing state) to causal.

The electronic device 102 may apply 1610 a causal or non-causal filter based on the state. For example, the electronic device 102 may average between at least two disparities corresponding to different times. For instance, the electronic device 102 may average a current disparity and a subsequent disparity (e.g., look ahead disparity, predicted disparity, etc.) in the non-causal case or may average between the current disparity and a past disparity in the causal case. In some approaches, predicted disparity may be further refined to generate an applied disparity vector with an averaging operation. The refined (e.g., averaged, smoothed, etc.) disparity may be the applied disparity utilized to perform the final warping.

The electronic device 102 may perform 1612 warping. For example, the electronic device 102 may warp one or more images based on the filtering (e.g., averaging). In some configurations, the warping may be GPU based warping. For example, the electronic device 102 may utilize a GPU to perform the warping (instead of the processor 112, for example). It should be noted that although the look ahead disparity $D_{t+5}$ is given as an example in FIG. 16, a different look ahead disparity (at a different time and/or at a different frame number) may be used in some configurations.

Figure 17:
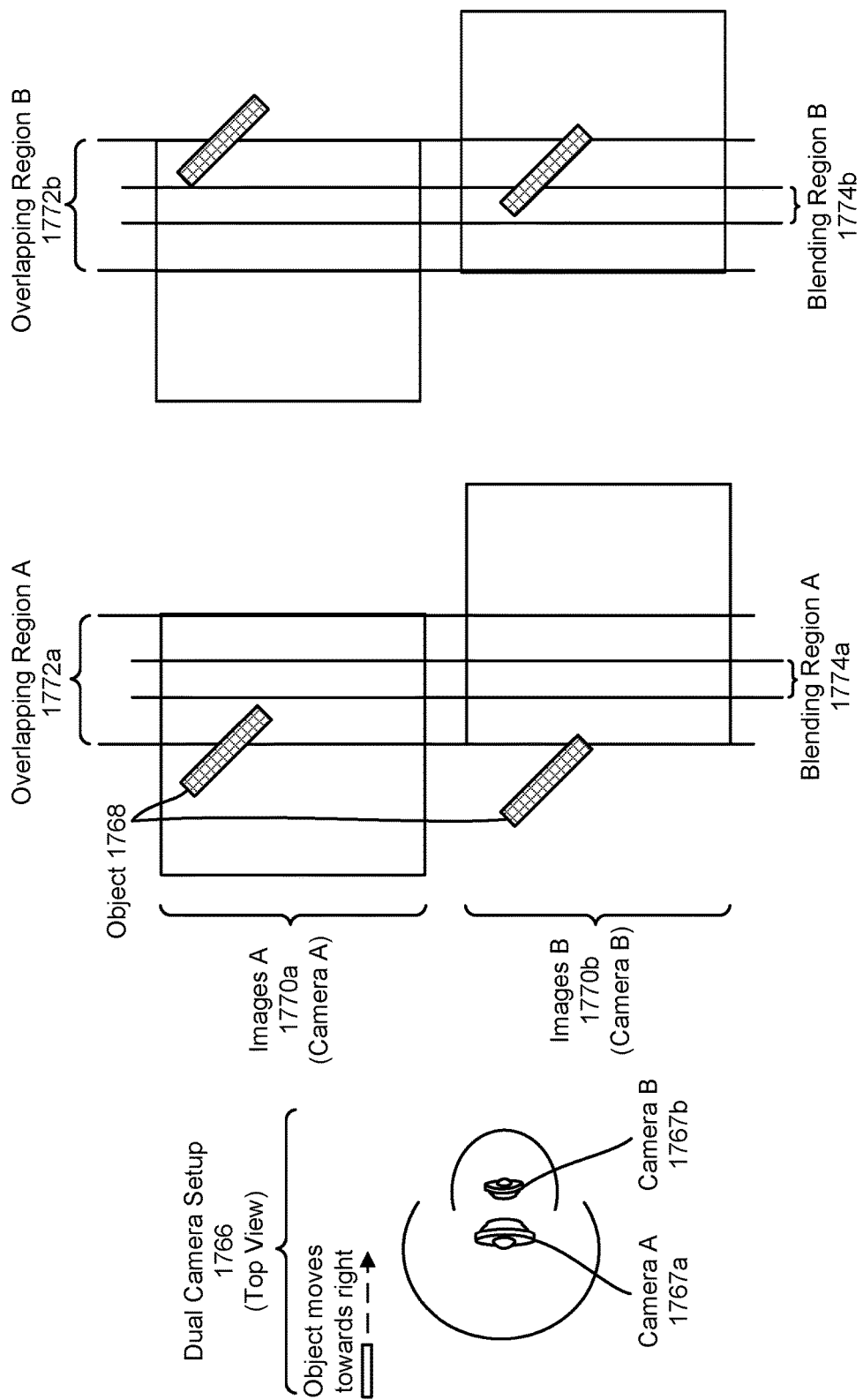
FIG. 17 is a diagram illustrating an example of a dual camera setup.

FIG. 17 is a diagram illustrating an example of a dual camera setup 1766. Some configurations of the systems and methods disclosed herein may provide a camera geometry-aware search scheme. For instance, the electronic device 102 described in connection with FIG. 1 may perform a geometry-aware search in accordance with the approach described in connection with FIG. 18. In this example, an object 1768 at a fixed depth may move from left to right in video (assuming background disparity is very different, for instance).

As illustrated in FIG. 17, the dual camera setup 1766 may include camera A 1767a (e.g., a left camera) and camera B 1767b (e.g., a right camera). As illustrated, an object 1768 may be observed from both cameras. Images A 1770a (e.g., left camera images) may correspond to camera A 1767a and images B 1770b (e.g., right camera images) may correspond to camera B 1767b. FIG. 17 illustrates overlapping regions 1772a-b between images A 1770a and images B 1770b. The overlapping regions 1772a-b may be a region (e.g., regions in frames) that is observable by both cameras. FIG. 17 also illustrates blending regions 1774a-b between images A 1770a and images B 1770b. The blending regions 1774a-b may be a region (e.g., regions in frames) within which blending may be performed. For example, some or all image data (e.g., pixel data) in the blending regions 1774a-b may be added, averaged, and/or otherwise combined. In some configurations, the blending regions 1774a-b may be subsets of the overlapping regions 1772a-b. In some approaches, images A 1770a and images B 1770b may be transformed images (e.g., rectangular images that are the result of transforming wide-angle images from wide angle cameras).

In the example illustrated in FIG. 17, the object 1768 appears first in overlapping region A 1772 in images A 1770a at a first time. Accordingly, the left region of images B 1770b is a part of a left region of images A 1770a at a first time. As the object 1768 continues moving to the right, the object 1768 leaves first from overlapping region B 1772b in images A 1770a at a second time. Accordingly, the right region of images A 1770a is a part of a right region of images B 1770b at a second time.

Figure 18:
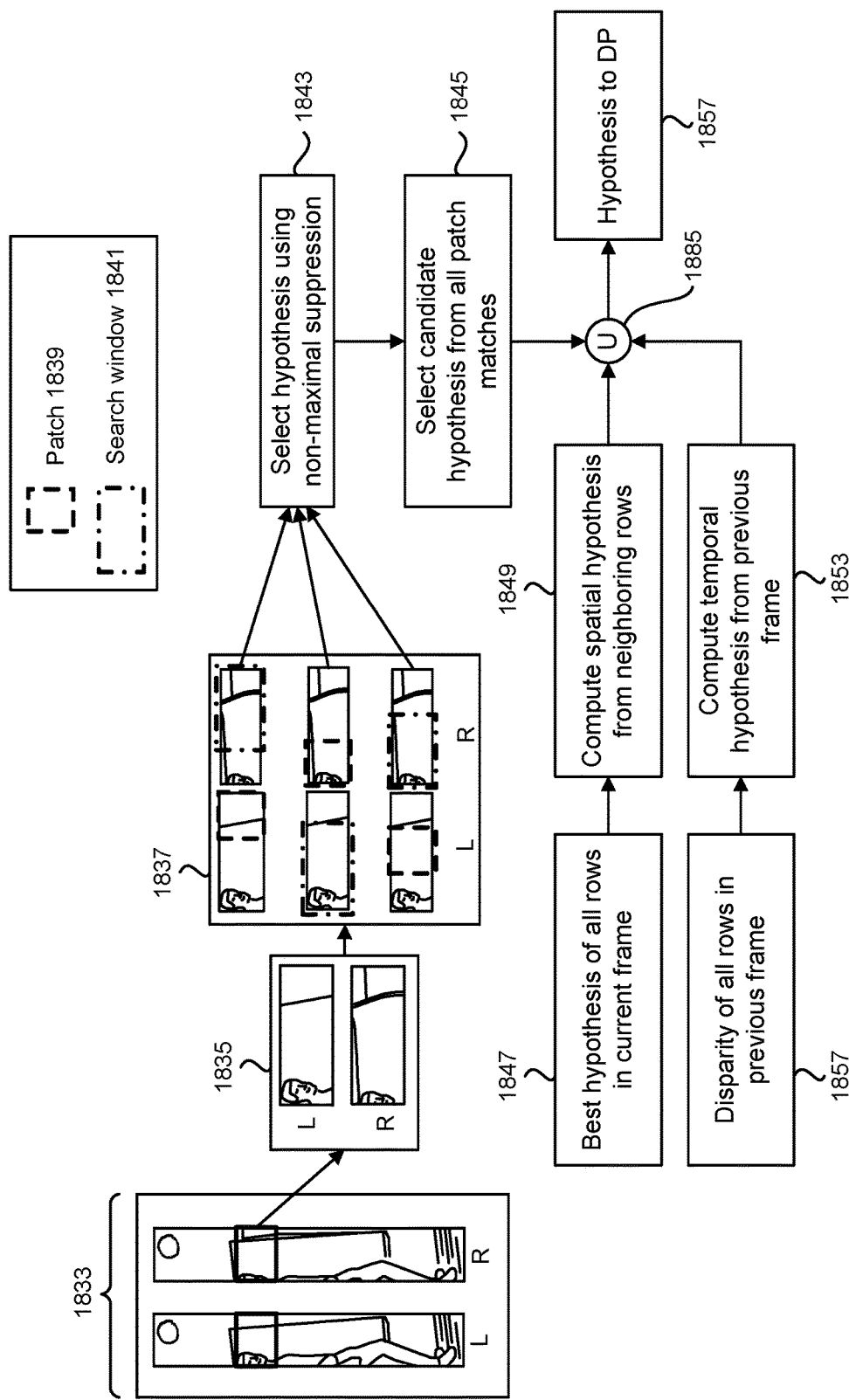
FIG. 18 is a diagram illustrating an example of a camera geometry aware search.

FIG. 18 is a diagram illustrating an example of a camera geometry aware search. For instance, the electronic device 102 described in connection with FIG. 1 may perform a geometry-aware search in accordance with the approach described in connection with FIG. 18. The geometry-aware search may be utilized to determine (e.g., measure) disparities in the overlapping region in some approaches.

In particular, FIG. 18 illustrates two rectangular images 1833 (e.g., pencil images), where L denotes a left image and R denotes a right image. The rectangular images 1833 may be the result of transforming overlapping regions of wide-angle cameras. Two sections 1835 from the rectangular images 1833 may be utilized for searching. As illustrated, patches 1839 and search windows 1841 (e.g., subset patches and/or subset search windows) may be utilized on the sections 1837.

The electronic device 102 may select 1843 a hypothesis using non-maximal suppression. For example, the electronic device 102 may select 1843 a hypothesis using non-maximal suppression based on the sections 1837 (e.g., patch(es) 1839 and/or search window(s) 1841). The electronic device 102 may also select 1845 a candidate hypothesis for all patch matches. The selected candidate hypothesis may be provided to a union 1885 operation.

The electronic device 102 may obtain 1847 a best hypothesis of all rows (e.g., pixel rows) in the current frame. The electronic device 102 may also compute 1849 a spatial hypothesis from neighboring rows. For example, the electronic device 102 may compute 1849 a spatial hypothesis from neighboring rows based on the best hypothesis (e.g., neighboring rows to the row of the best hypothesis). The spatial hypothesis may be provided to the union 1885 operation.

The electronic device 102 may obtain 1857 a disparity of all rows (e.g., pixel rows) in a previous frame. The electronic device 102 may also compute 1853 a temporal hypothesis from a previous frame. For example, the electronic device 102 may compute 1853 a temporal hypothesis from a previous frame based on the disparity. The temporal hypothesis may be provided to the union 1885 operation.

The union 1885 operation may determine a union with the candidate hypothesis, the spatial hypothesis, and the temporal hypothesis. The hypothesis may be provided 1857 to dynamic programming (DP).

An example of cost function optimization using dynamic programming is given as follows. A cost of assigning $(d_1^t, d_2^t, \ldots, d_r^t)$ as disparity values to rows $(1, 2, \ldots, R)$ may be given in accordance with Equation (4).

$$\text{cost}(d_1^t, d_2^t, \ldots, d_R^t) = \sum_r \left(1 - NCC_r^t + \lambda_{spatial}(\|d_r^t - d_{r-1}^t\| + \|d_r^t - d_{r+1}^t\|) + \lambda_{temporal}\left\|d_r^t - \hat{d}_r^{t-1}\right\|\right) \quad (4)$$

In Equation (4), $1-NCC_r^t$ may indicate match quality, $$\lambda_{spatial}(\|d_r^t - d_{r-1}^t\| + \|d_r^t - d_{r+1}^t\|)$$

is a spatial term, and $$\lambda_{temporal}\left\|d_r^t - \hat{d}_r^{t-1}\right\|$$

is a temporal term. In particular, $NCC_r^t$ is the normalized cross-correlation (NCC) of a patch match of the r-th row with a disparity hypothesis $d_r^t$ at time t, $d_r^t$ is a disparity hypothesis for the r-th row at time t, $\hat{d}_r^{t-1}$ is a best disparity hypothesis for the r-th row at time (t−1), $\lambda_{spatial}$ is a spatial smoothing term, and $\lambda_{temporal}$ is a temporal smoothing term. In some approaches, a cost to converge to a static seam for very close object may be utilized.

Figure 19:
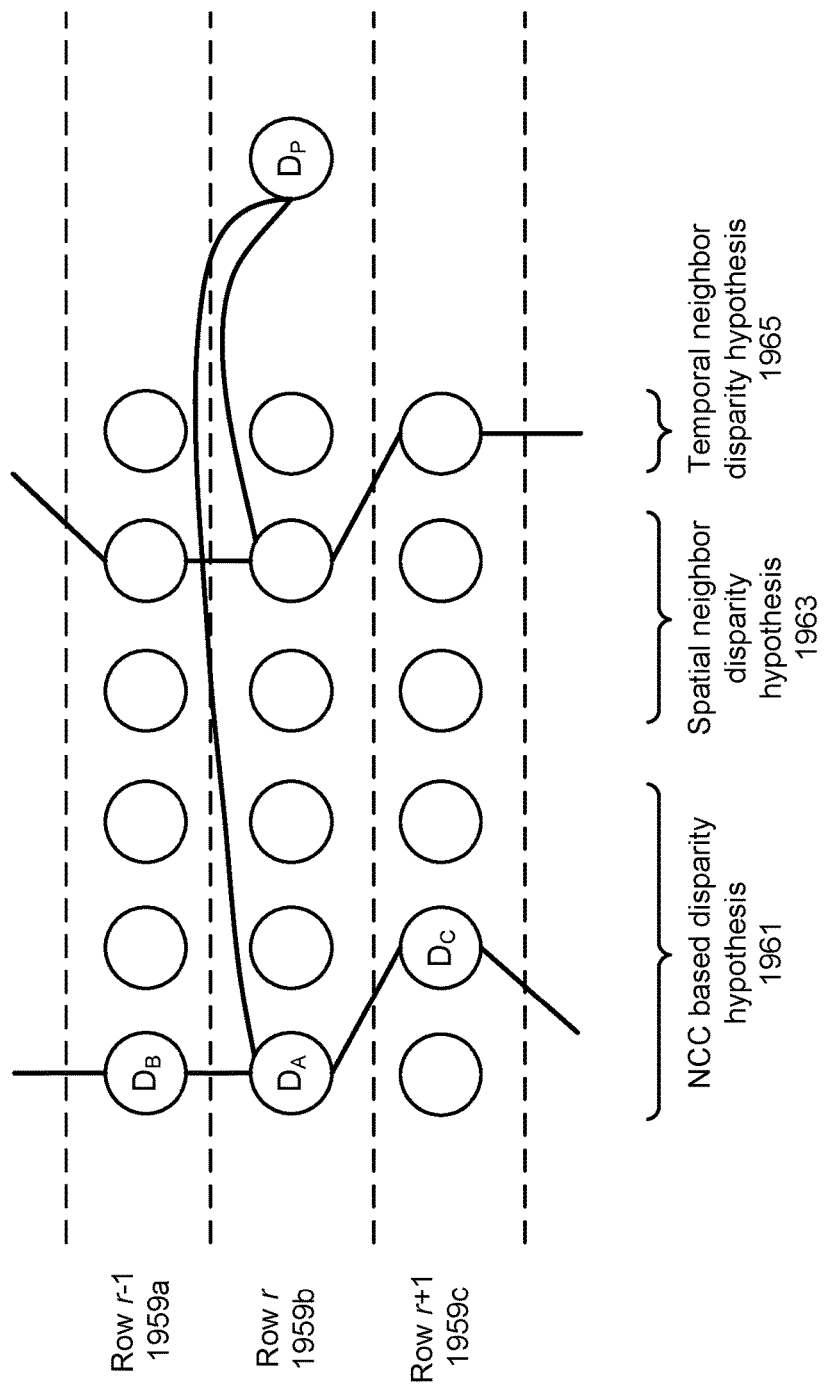
FIG. 19 is a diagram illustrating an example of cost function optimization using dynamic programming.

FIG. 19 is a diagram illustrating an example of cost function optimization using dynamic programming. For example, the electronic device 102 described in connection with FIG. 1 may perform cost function optimization using dynamic programming in accordance with the approach described in connection with FIG. 19.

In particular, FIG. 19 illustrates row r−1 1959a, row r 1959b, and row r+1 1959c (e.g., pixel rows). Disparities $D_B$, $D_A$, and $D_C$ are also illustrated. FIG. 19 also illustrates an NCC based disparity hypothesis 1961, a spatial neighbor disparity hypothesis 1963, and a temporal neighbor disparity hypothesis 1965. The disparity $D_P$ is also illustrated, which may be a disparity computed in a previous frame (e.g., temporal neighbor).

In accordance with some configurations of the systems and methods disclosed herein, global optimization may help reduce errors. For example, local cost based matches may be very noisy. Using a temporal cost may reduce flicker due to noisy matches. $D_P$ may provide a low computation intensive approach to improve (e.g., optimize) the global cost function.

Figure 20:
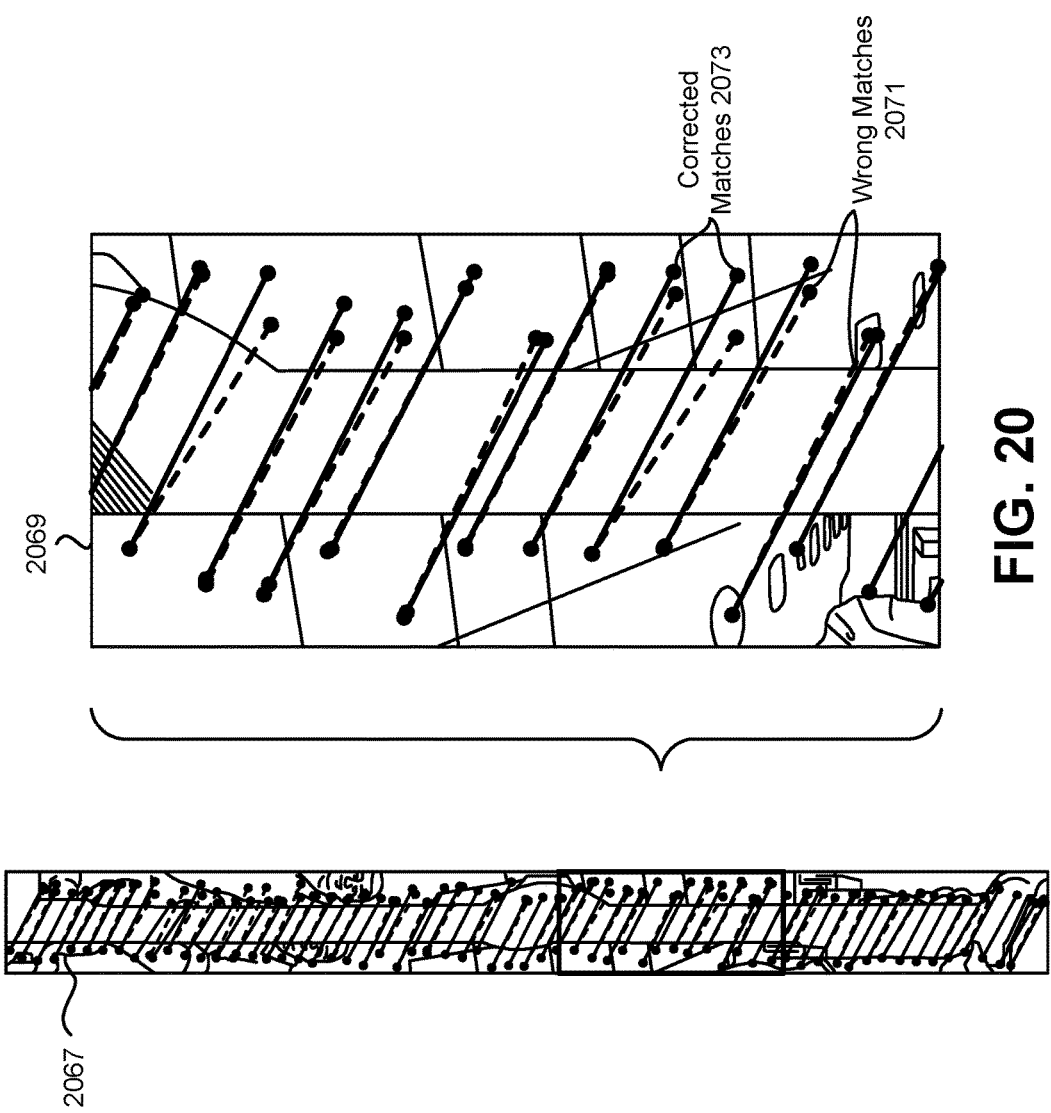
FIG. 20 is a diagram illustrating another example of cost function optimization using dynamic programming.

FIG. 20 is a diagram illustrating another example of cost function optimization using dynamic programming. Example matches 2067 (e.g., matching points, feature points, etc.) between rectangular images (e.g., left and right images, pencil images, etc.) are illustrated. For clarity, a section 2069 of the matches 2067 is illustrated. The section 2069 includes wrong matches 2071 (based on NCC search based disparity, for example) and corrected matches 2073 (e.g., dynamic programming output disparities). In particular, FIG. 20 illustrates how wrong matches 2071 may be corrected by dynamic programming.

Figure 21:
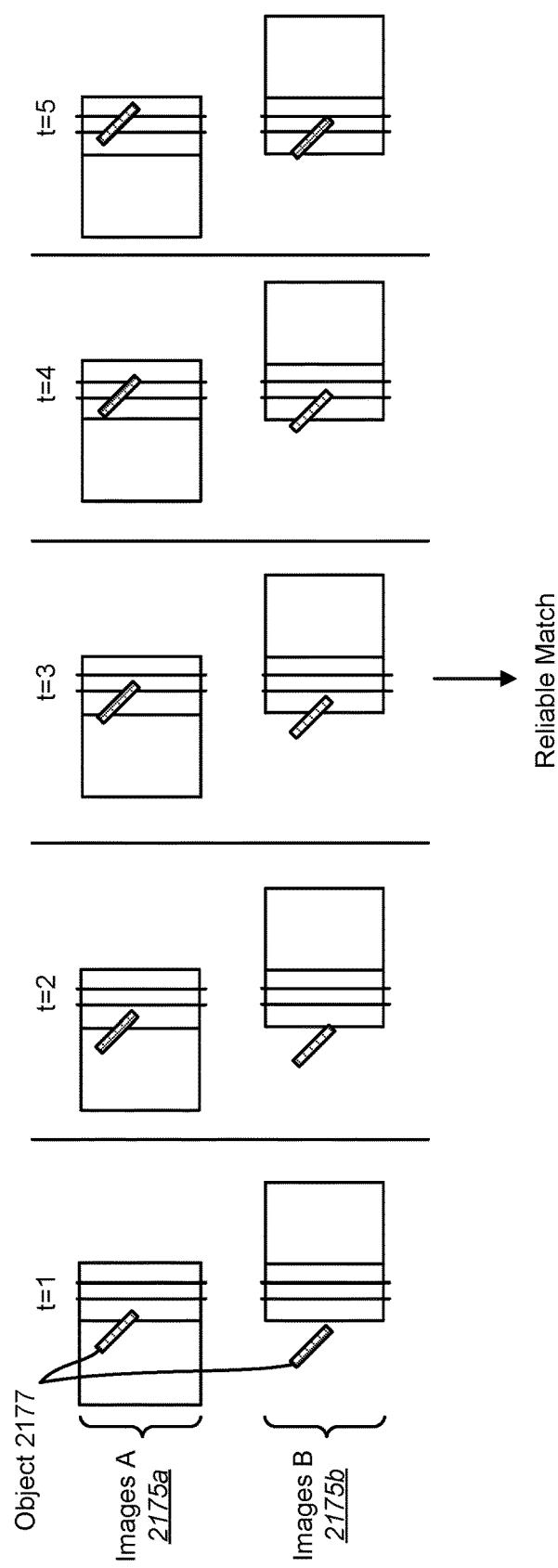
FIG. 21 is a diagram illustrating an example of temporal smoothing and look ahead.

FIG. 21 is a diagram illustrating an example of temporal smoothing and look ahead. The electronic device 102 described in connection with FIG. 1 may perform temporal smoothing and/or look ahead in accordance with the approach described in connection with FIG. 21 in some configurations.

In particular, FIG. 21 illustrates images A 2175a (e.g., left camera images) and images B 2175b (e.g., right camera images). As an object 2177 moves from left to right over time a reliable match may be obtained in the third frame (e.g., at t=3).

Figure 22:
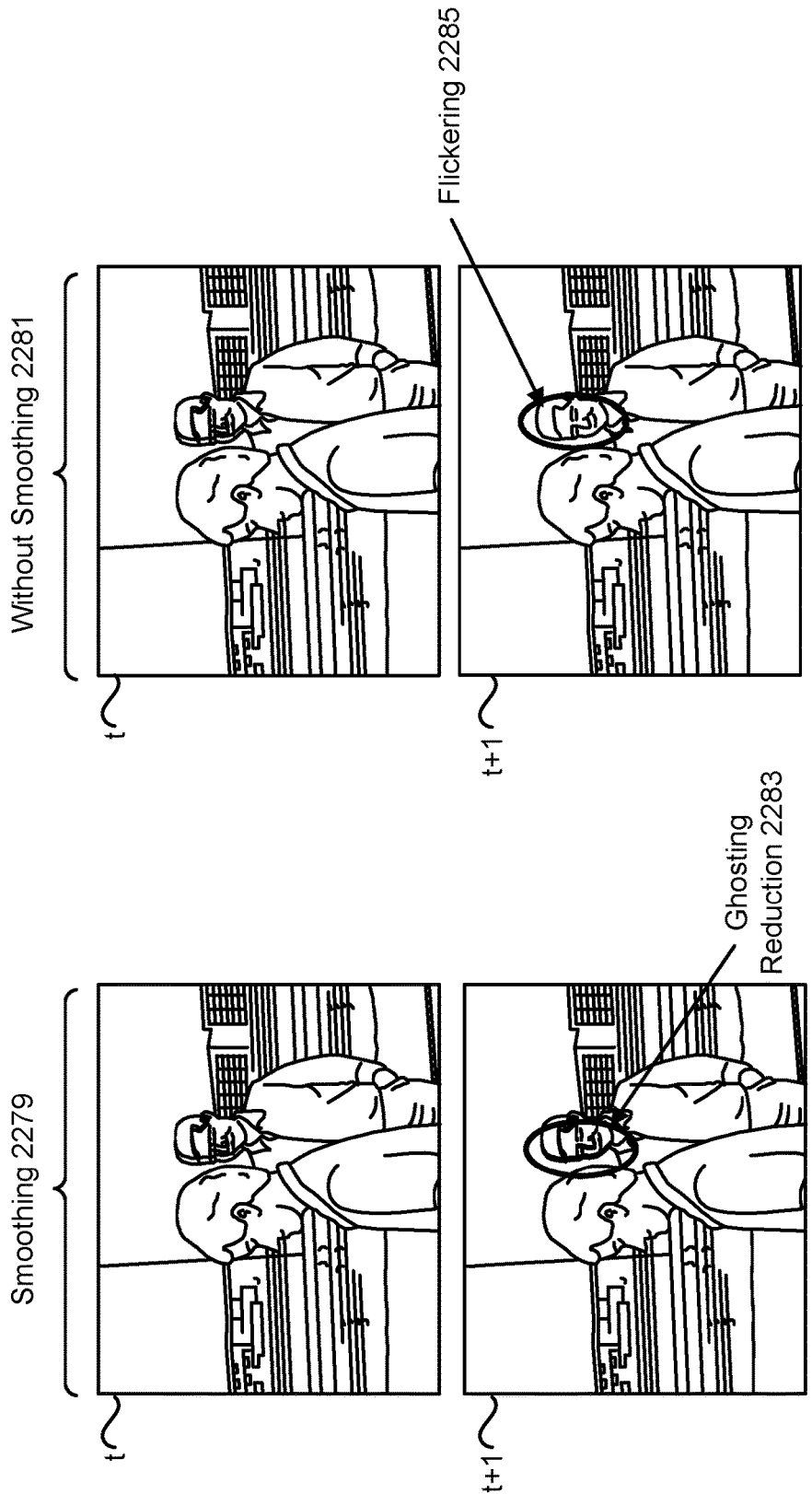
FIG. 22 is a diagram illustrating an example of temporal smoothing.

FIG. 22 is a diagram illustrating an example of temporal smoothing 2279. The electronic device 102 described in connection with FIG. 1 may perform temporal smoothing in accordance with the approach described in connection with FIG. 21 in some configurations. In particular, smoothing 2279 is shown with a frame at time t and a frame at time t+1. A frame a time t and a frame at time t+1 without smoothing 2281 are also shown. Without smoothing, an abrupt change in disparity may cause flickering 2285 (e.g., flickering artifacts). With smoothing 2279, ghosting reduction 2283 may be achieved, where ghosting reduces smoothly over time, which may avoid sudden flickering.

Figure 23:
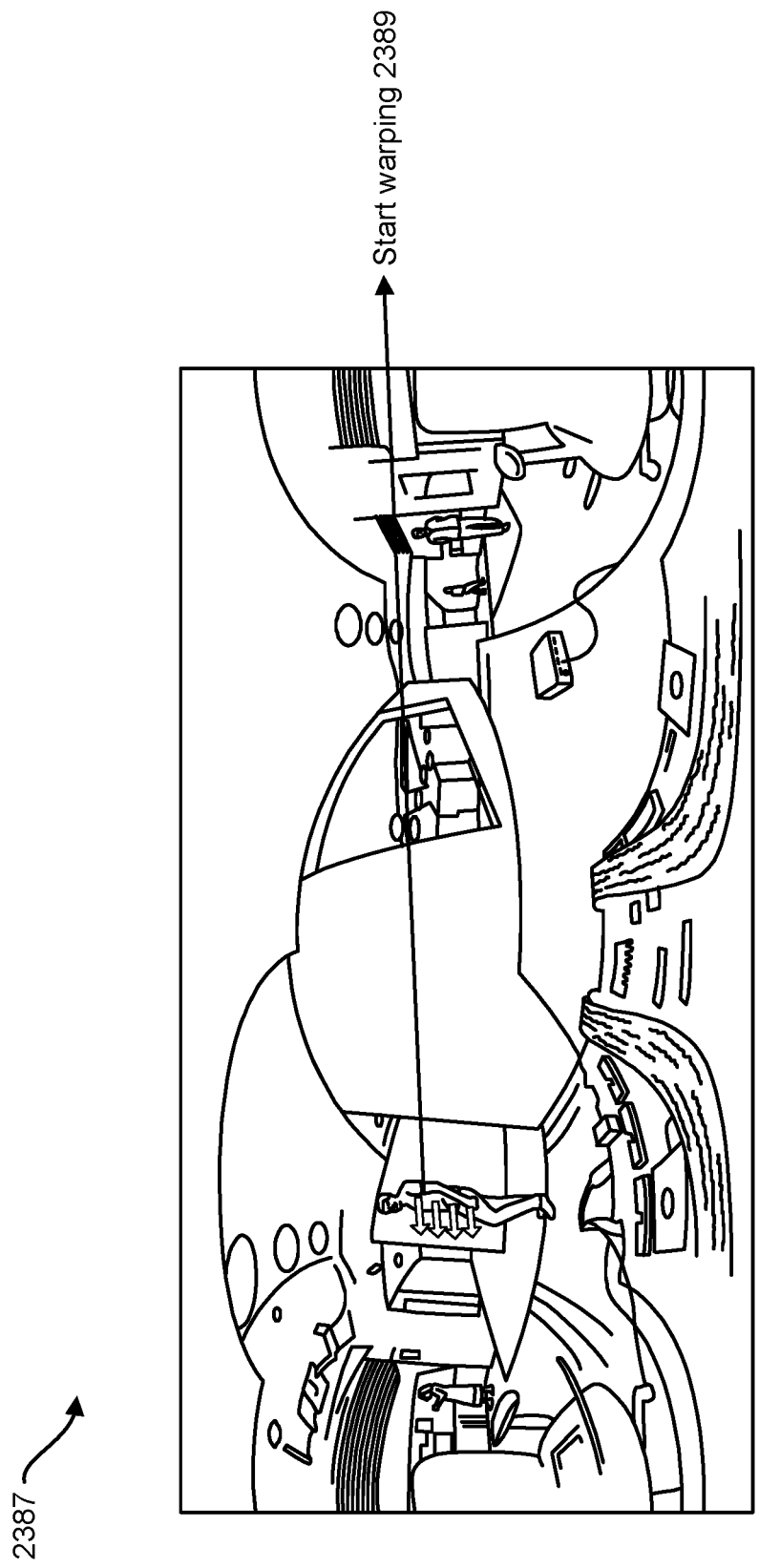
FIG. 23 is a diagram illustrating an example of predictive temporal warp.

FIG. 23 is a diagram illustrating an example 2387 of predictive temporal warp. For example, the electronic device 102 may start warping 2389 even before the foreground object enters the blending region. In some approaches, prediction may be based on optical flow.

Figure 24:
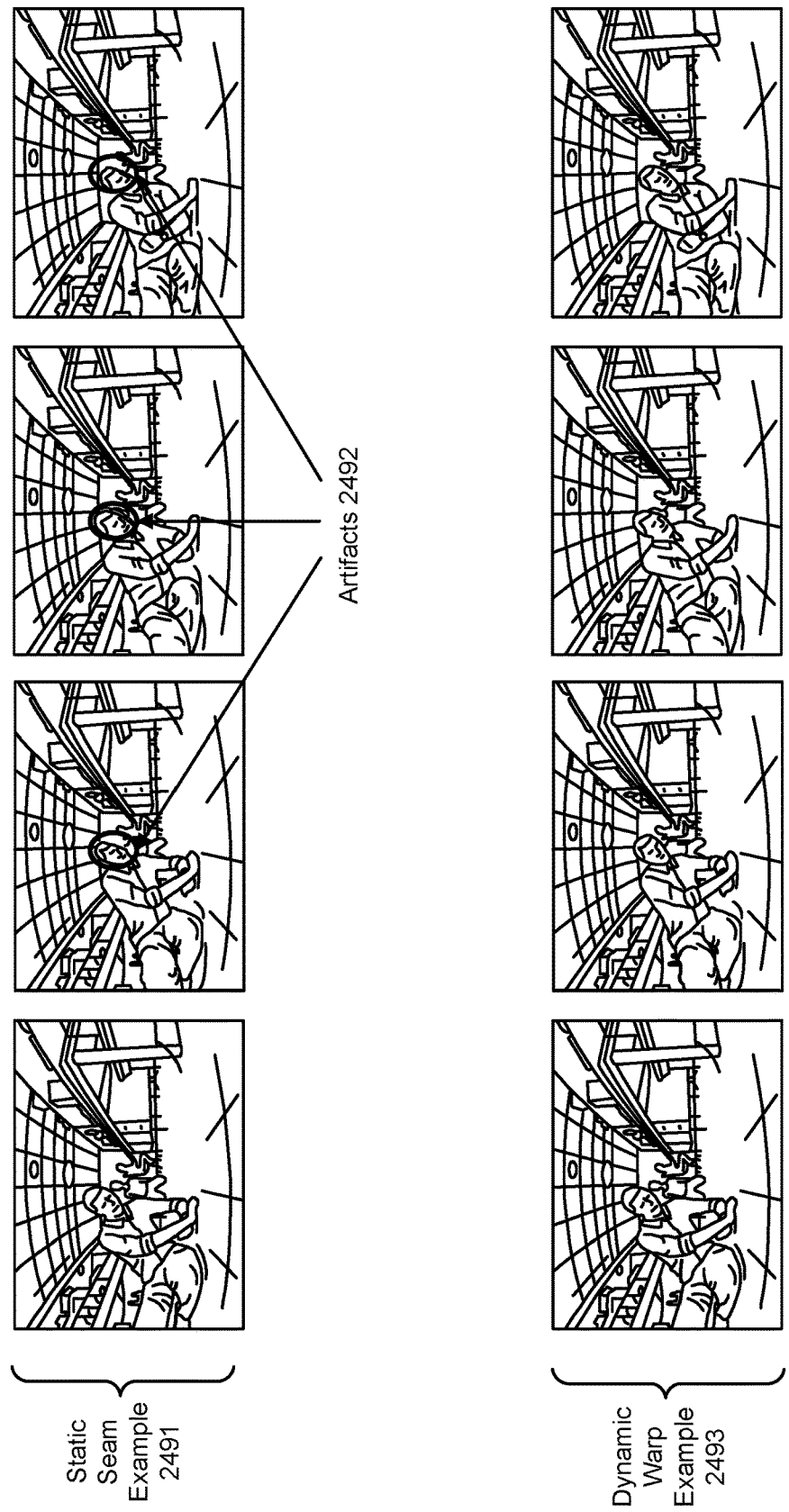
FIG. 24 is a diagram illustrating a static seam example and a dynamic warp example.

FIG. 24 is a diagram illustrating a static seam example 2491 and a dynamic warp example 2493. As can be observed in the static seam example 2491, artifacts 2492 may occur in the overlapping region when using static seam-based stitching. The dynamic warp example 2493 illustrates that such artifacts 2492 may be reduced or avoided when using dynamic warp-based stitching.

Figure 25:
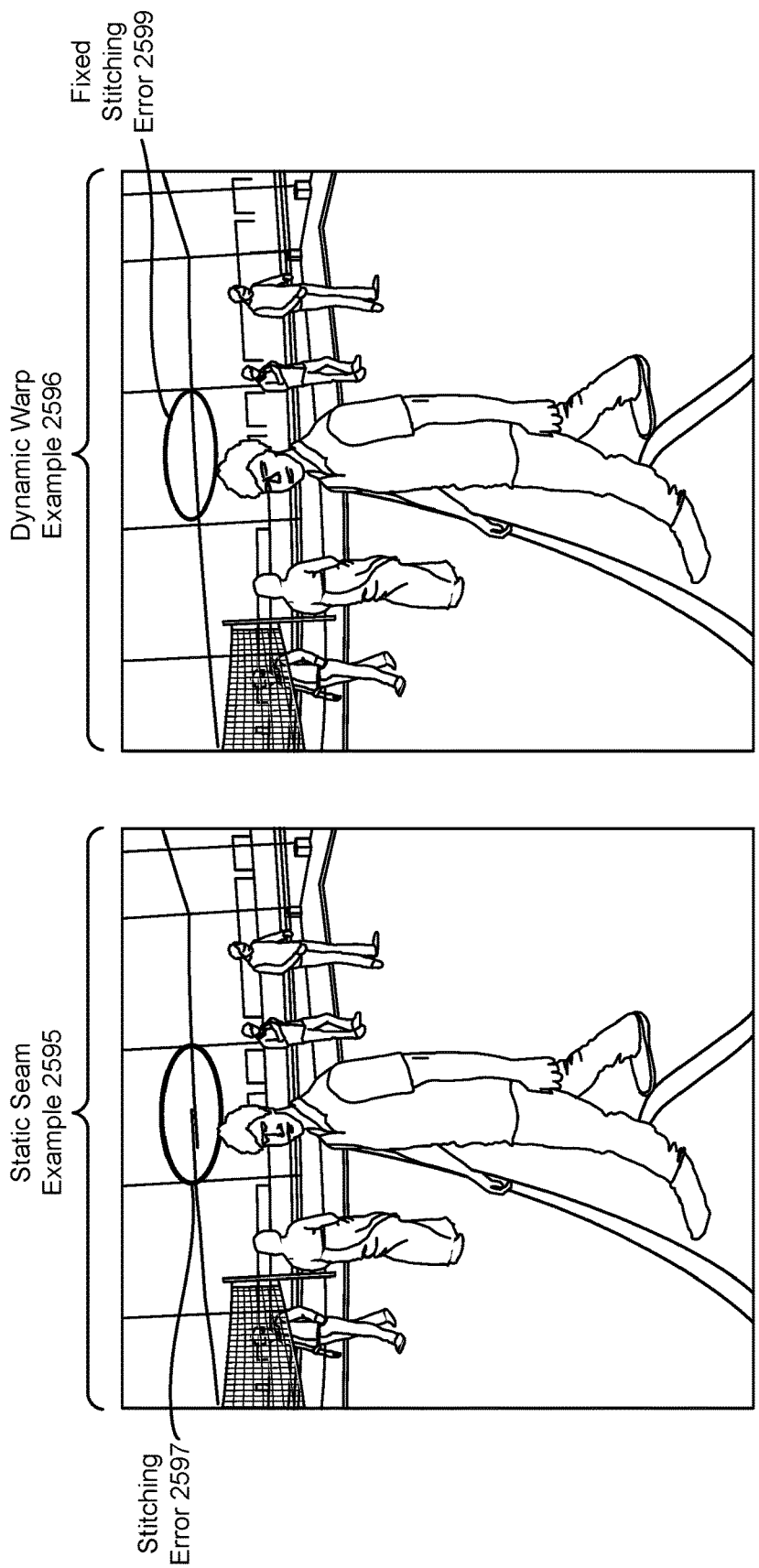
FIG. 25 is a diagram illustrating a static seam example and a dynamic warp example.

FIG. 25 is a diagram illustrating a static seam example 2595 and a dynamic warp example 2596. In particular, FIG. 25 illustrates how some configurations of the systems and methods disclosed herein may beneficially fix calibration errors. In the static seam example 2595, the camera system has moved after calibration. This may cause a stitching error 2597 in a case of static seam stitching. In the dynamic warp example 2596, dynamic warp stitching in accordance with some configurations of the systems and methods disclosed herein may result in a fixed stitching error 2599. In particular, applying dynamic warp in accordance with some configurations of the systems and methods disclosed herein may reduce and/or avoid stitching errors that may occur as a result of camera movement after calibration.

Figure 26:
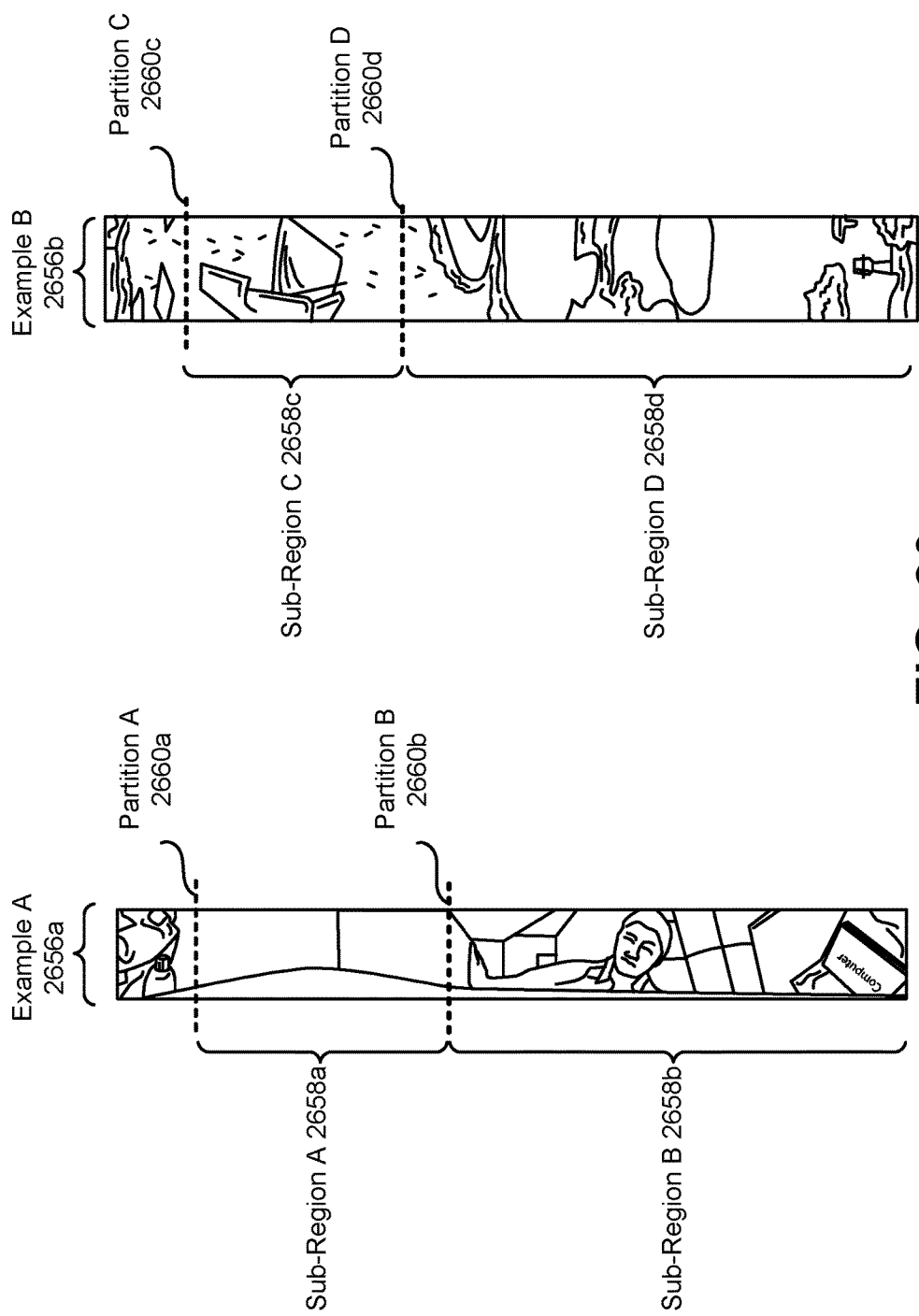
FIG. 26 is a diagram illustrating examples of content-adaptive selection of stitching schemes.

FIG. 26 is a diagram illustrating examples 2656a-b of content-adaptive selection of stitching schemes. In some implementations, the electronic device 102 may be configured to select between different stitching schemes for different portions of images. Each of the examples 2656a-b represents an overlapping region between images. In some approaches, each of the examples 2656a-b may illustrate overlapping regions that have been transformed from a curved overlapping region to a rectangular image using a geometrical transformation.

In some approaches, an overlapping region may be partitioned into areas (e.g., sub-regions). For example, an overlapping region may be partitioned based on content (e.g., content measure(s), motion measure, disparity measure, etc.). In example A 2656a, the overlapping region has been partitioned with partition A 2660a and partition B 2660b into sub-region A 2658a and sub-region B 2658b.

In sub-region A 2658a, there are very few matching points (e.g., point features, keypoints, corners, etc.). Matching points may be needed to perform dynamic warp-based stitching. Because there are very few matching points in sub-region A 2658a, dynamic warp-based stitching may not be performed. Instead, seam-based stitching (e.g., dynamic seam-based stitching) may be selected and/or performed for sub-region A 2658a in accordance with some configurations of the systems and methods disclosed herein.

In sub-region B 2658b, objects (e.g., a person's face and a book) are close to the cameras. Accordingly, disparity between the images (e.g., a disparity measure) may be high. Dynamic warp-based stitching may be selected and/or performed for sub-region B 2658b in accordance with some configurations of the systems and methods disclosed herein.

In example B 2656b, the overlapping region has been partitioned with partition C 2660c and partition D 2660d into sub-region C 2658c and sub-region D 2658d. In sub-region C 2658c, objects are close to the cameras. Accordingly, disparity between the images (e.g., a disparity measure) may be high. Dynamic warp-based stitching may be selected and/or performed for sub-region C 2658c in accordance with some configurations of the systems and methods disclosed herein.

In sub-region D 2658d, objects are distant (e.g., far) from the cameras. Matching points may be needed to perform dynamic warp-based stitching. Accordingly, disparity between the images (e.g., a disparity measure) may be low. Dynamic seam-based stitching may be selected and/or performed for sub-region D 2658d in accordance with some configurations of the systems and methods disclosed herein. Dynamic seam-based stitching may bypass (e.g., circumvent, go around, etc.) small parallax regions.

Under large image and/or camera motion (e.g., a high motion measure), static seam-based stitching may be selected. Motion may mask the stitching errors due to parallax. For example, image blur during camera motion may not allow computation of reliable feature matches used for dynamic warp-based stitching. Flickering resulting from using a dynamic seam-based stitching scheme (for high motion areas, for example) may be more disturbing to the viewer compared to static seam stitching errors.

In some approaches, if an object is too close to the cameras, the electronic device 102 may switch to static seam stitching (from dynamic warp stitching, for example). For instance, if a detected depth is small (e.g., less than a threshold) for an object, if a detected disparity is large (e.g., larger than a threshold), and/or if matching features cannot be found between images, the electronic device 102 may automatically resort to static seam stitching smoothly. This may avoid distortion and/or flickering.

Figure 27:
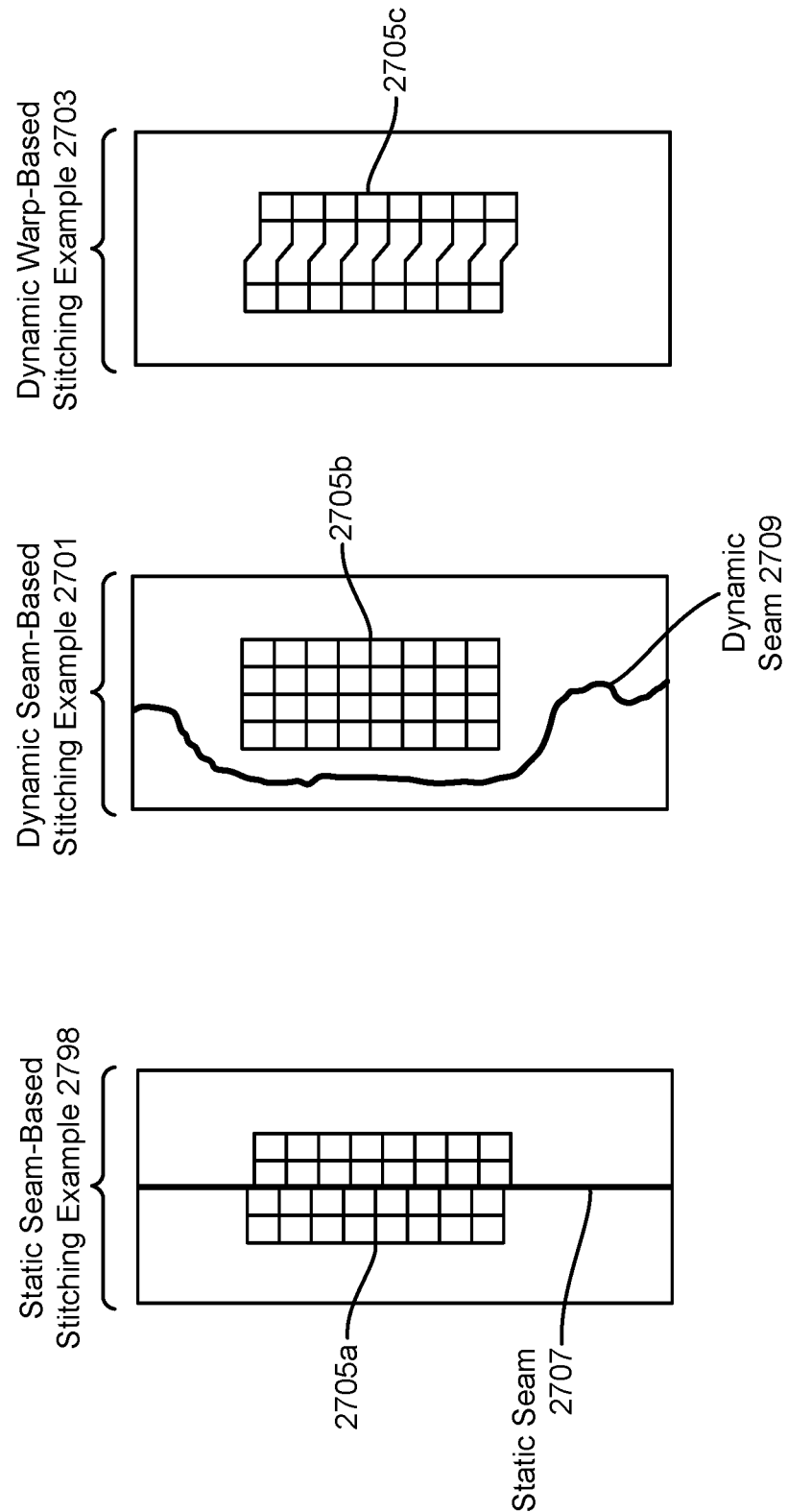
FIG. 27 is a diagram illustrating a static seam-based stitching example, a dynamic seam-based stitching example, and a dynamic warp-based stitching example.

FIG. 27 is a diagram illustrating a static seam-based stitching example 2798, a dynamic seam-based stitching example 2701, and a dynamic warp-based stitching example 2703. In the static seam-based stitching example 2798, images are stitched with a static seam 2707 to produce a stitched image. A static seam 2707 may be a predetermined and/or unchanging seam between images. If the static seam 2707 crosses an object 2705a (e.g., a foreground object, a foreground region, etc.), an artifact (e.g., discontinuity) in the object 2705a may appear in the stitched image due to parallax.

In the dynamic seam-based stitching example 2701, images are stitched with a dynamic seam 2709 to produce a stitched image. A dynamic seam 2709 may be determined in order to avoid crossing an object 2705b (e.g., a foreground object, a foreground region, etc.). For example, the dynamic seam 2709 may be determined by reducing (e.g., minimizing) a cost. The cost may be high for some objects (e.g., foreground regions). Accordingly, the dynamic seam 2709 may avoid the object 2705b by bypassing (e.g., going around, etc.) the object 2705b.

In the dynamic warp-based stitching example 2703, images are stitched by warping one or more images to produce a stitched image. Warping the images may result in artifacts appearing in an object 2705c of the stitched image. In some configurations, the electronic device 102 may select between stitching schemes (e.g., between a static stitching scheme, a dynamic seam stitching scheme, and/or a dynamic warp stitching scheme).

Figure 28:
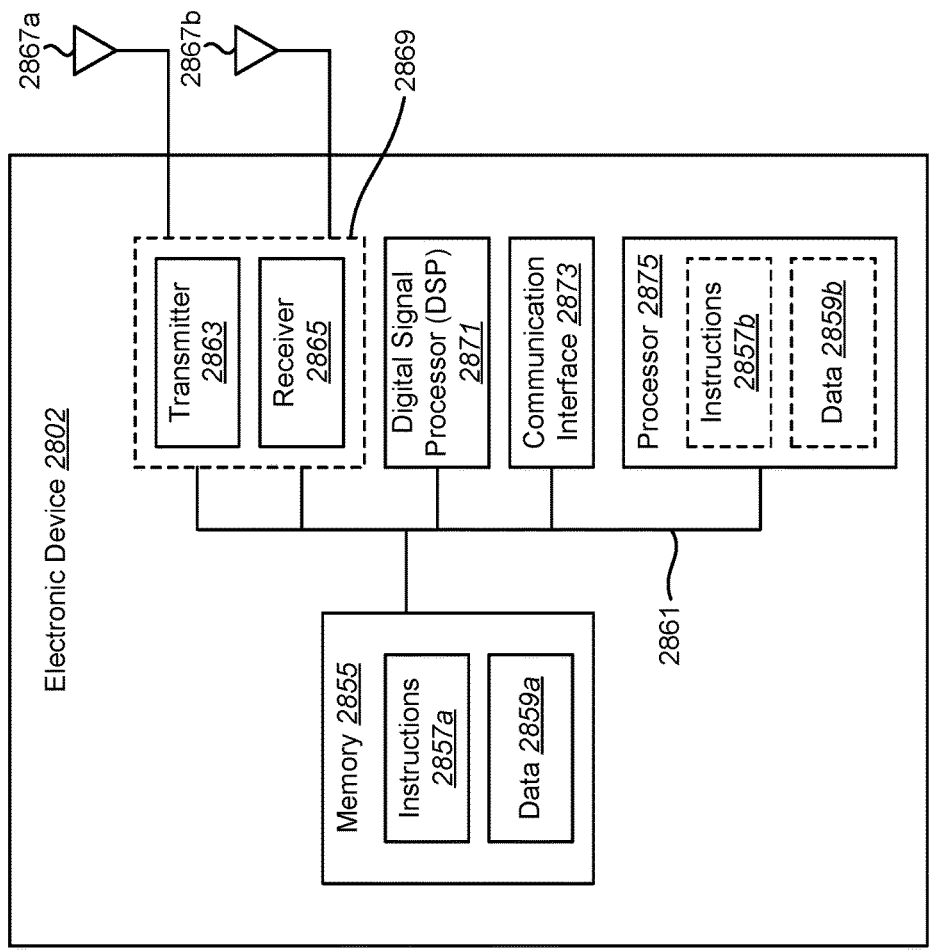
FIG. 28 illustrates certain components that may be included within an electronic device.

FIG. 28 illustrates certain components that may be included within an electronic device 2802. The electronic device 2802 may be an example of and/or may be implemented in accordance with the electronic device 102 described in connection with FIG. 1. The electronic device 2802 may be (or may be included within) a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 2802 includes a processor 2875. The processor 2875 may be a general purpose single- or multi-chip microprocessor (e.g., an ARM), a special purpose microprocessor (e.g., a digital signal processor (DSP)), a microcontroller, a programmable gate array, etc. The processor 2875 may be referred to as a central processing unit (CPU). Although just a single processor 2875 is shown in the electronic device 2802, in an alternative configuration, a combination of processors (e.g., an ARM and DSP) could be used.

The electronic device 2802 also includes memory 2855. The memory 2855 may be any electronic component capable of storing electronic information. The memory 2855 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 2859a and instructions 2857a may be stored in the memory 2855. The instructions 2857a may be executable by the processor 2875 to implement one or more of the methods 200, 1100, functions, and/or operations described herein. Executing the instructions 2857a may involve the use of the data 2859a that is stored in the memory 2855. When the processor 2875 executes the instructions 2857, various portions of the instructions 2857b may be loaded onto the processor 2875, and various pieces of data 2859b may be loaded onto the processor 2875.

The electronic device 2802 may also include a transmitter 2863 and a receiver 2865 to allow transmission and reception of signals to and from the electronic device 2802. The transmitter 2863 and receiver 2865 may be collectively referred to as a transceiver 2869. One or multiple antennas 2867a-b may be electrically coupled to the transceiver 2869. The electronic device 2802 may also include (not shown) multiple transmitters, multiple receivers, multiple transceivers and/or additional antennas.

The electronic device 2802 may include a digital signal processor (DSP) 2871. The electronic device 2802 may also include a communication interface 2873. The communication interface 2873 may enable one or more kinds of input and/or output. For example, the communication interface 2873 may include one or more ports and/or communication devices for linking other devices to the electronic device 2802. Additionally or alternatively, the communication interface 2873 may include one or more other interfaces (e.g., touchscreen, keypad, keyboard, microphone, camera, etc.). For example, the communication interface 2873 may enable a user to interact with the electronic device 2802.

The various components of the electronic device 2802 may be coupled together by one or more buses, which may include a power bus, a control signal bus, a status signal bus, a data bus, etc. For the sake of clarity, the various buses are illustrated in FIG. 28 as a bus system 2861.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, comprising:
    receiving a plurality of images from a first camera with a first field of view and a second plurality of images from a second camera with a second field of view, wherein an overlapping region exists between the first field of view and the second field of view;
    predicting a disparity of a moving object present in a first image of the first plurality of images, wherein the moving object is not present in a corresponding second image of the second plurality of images;
    determining warp vectors based on the predicted disparity; and
    combining an image from the first plurality of images with an image from the second plurality of images based on the determined warp vectors.

2. The method of claim 1, further comprising predicting an entrance time for the moving object to enter the overlapping region, wherein determining the warp vectors is further based on the predicted entrance time.

3. The method of claim 2, wherein predicting the entrance time comprises:
    tracking the moving object in the first plurality of images;
    determining a velocity of the moving object based on the tracking; and
    determining the entrance time based on the velocity and based on a distance between the moving object and the overlapping region.

4. The method of claim 1, wherein predicting the disparity comprises:
    performing object detection to determine a bounding box of the moving object; and
    determining the disparity based on a size of the bounding box.

5. The method of claim 1, wherein predicting the disparity is based on depth detection.

6. The method of claim 5, wherein depth detection is performed using a depth sensor.

7. The method of claim 1, wherein predicting the disparity is based on missing feature detection between at least one of the first plurality of images from the first camera and at least one of the second plurality of images from the second camera.

8. The method of claim 1, wherein determining the warp vectors based on the predicted disparity comprises averaging disparities corresponding to at least two different times.

9. The method of claim 1, wherein determining the warp vectors comprises:
- determining whether a first disparity difference of a current frame disparity and the predicted disparity of a look-ahead frame is greater than a first threshold;
- applying a non-causal filter to the current frame disparity and the predicted disparity in a case that the first disparity difference is greater than the first threshold;
- determining whether a second disparity difference of the current frame disparity and the predicted disparity of the look-ahead frame is greater than a second threshold; and
- applying a causal filter to the current frame disparity and the predicted disparity in a case that the second disparity difference is greater than the second threshold.

10. The method of claim 1, wherein said combining comprises:
- performing dynamic warping on the image from the first plurality of images to produce a first warped image and on the image from the second plurality of images to produce a second warped image; and
- combining the first warped image and the second warped image.

11. The method of claim 10, further comprising performing color correction on at least one of the first warped image and the second warped image.

12. An electronic device, comprising:
- a memory;
- a processor coupled to the memory, wherein the processor is configured to:
  - receive a plurality of images from a first camera with a first field of view and a second plurality of images from a second camera with a second field of view, wherein an overlapping region exists between the first field of view and the second field of view;
  - predict a disparity of a moving object present in a first image of the first plurality of images, wherein the moving object is not present in a corresponding second image of the second plurality of images;
  - determine warp vectors based on the predicted disparity; and
  - combine an image from the first plurality of images with an image from the second plurality of images based on the determined warp vectors.

13. The electronic device of claim 12, wherein the processor is configured to predict an entrance time for the moving object to enter the overlapping region, and wherein the processor is configured to determine the warp vectors further based on the predicted entrance time.

14. The electronic device of claim 13, wherein the processor is configured to predict the entrance time by:
- tracking the moving object in the first plurality of images;
- determining a velocity of the moving object based on the tracking; and
- determining the entrance time based on the velocity and based on a distance between the moving object and the overlapping region.

15. The electronic device of claim 12, wherein the processor is configured to predict the disparity by:
- performing object detection to determine a bounding box of the moving object; and
- determining the disparity based on a size of the bounding box.

16. The electronic device of claim 12, wherein the processor is configured to predict the disparity based on depth detection.

17. The electronic device of claim 16, wherein the processor is configured to perform depth detection using a depth sensor.

18. The electronic device of claim 12, wherein the processor is configured to predict the disparity based on missing feature detection between at least one of the first plurality of images from the first camera and at least one of the second plurality of images from the second camera.

19. The electronic device of claim 12, wherein the processor is configured to determine the warp vectors based on the predicted disparity by averaging disparities corresponding to at least two different times.

20. The electronic device of claim 12, wherein the processor is configured to determine the warp vectors by:
- determining whether a first disparity difference of a current frame disparity and the predicted disparity of a look-ahead frame is greater than a first threshold;
- applying a non-causal filter to the current frame disparity and the predicted disparity in a case that the first disparity difference is greater than the first threshold;
- determining whether a second disparity difference of the current frame disparity and the predicted disparity of the look-ahead frame is greater than a second threshold; and
- applying a causal filter to the current frame disparity and the predicted disparity in a case that the second disparity difference is greater than the second threshold.

21. The electronic device of claim 12, wherein the processor is configured to perform said combining by:
- performing dynamic warping on the image from the first plurality of images to produce a first warped image and on the image from the second plurality of images to produce a second warped image; and
- combining the first warped image and the second warped image.

22. The electronic device of claim 21, further comprising performing color correction on at least one of the first warped image and the second warped image.

23. A non-transitory tangible computer-readable medium storing computer executable code, comprising:
- code for causing an electronic device to receive a plurality of images from a first camera with a first field of view and a second plurality of images from a second camera with a second field of view, wherein an overlapping region exists between the first field of view and the second field of view;
- code for causing the electronic device to predict a disparity of a moving object present in a first image of the first plurality of images, wherein the moving object is not present in a corresponding second image of the second plurality of images;
- code for causing the electronic device to determine warp vectors based on the predicted disparity; and
- code for causing the electronic device to combine an image from the first plurality of images with an image from the second plurality of images based on the determined warp vectors.

24. The computer-readable medium of claim 23, further comprising code for causing the electronic device to predict an entrance time for the moving object to enter the overlapping region, and wherein the code for causing the electronic device to determine the warp vectors is further based on the predicted entrance time.

25. The computer-readable medium of claim 23, wherein the code for causing the electronic device to predict the disparity comprises:

code for causing the electronic device to perform object detection to determine a bounding box of the moving object; and code for causing the electronic device to determine the disparity based on a size of the bounding box.

26. The computer-readable medium of claim 23, wherein the code for causing the electronic device to determine the warp vectors based on the predicted disparity comprises code for causing the electronic device to average disparities corresponding to at least two different times.

27. An apparatus, comprising:

means for receiving a plurality of images from a first camera with a first field of view and a second plurality of images from a second camera with a second field of view, wherein an overlapping region exists between the first field of view and the second field of view;

means for predicting a disparity of a moving object present in a first image of the first plurality of images, wherein the moving object is not present in a corresponding second image of the second plurality of images;

means for determining warp vectors based on the predicted disparity; and means for combining an image from the first plurality of images with an image from the second plurality of images based on the determined warp vectors.

28. The apparatus of claim 27, further comprising means for predicting an entrance time for the moving object to enter the overlapping region, and wherein the means for determining the warp vectors is further based on the predicted entrance time.

29. The apparatus of claim 27, wherein the means for predicting the disparity comprises:

means for performing object detection to determine a bounding box of the moving object; and means for determining the disparity based on a size of the bounding box.

30. The apparatus of claim 27, wherein the means for determining the warp vectors based on the predicted disparity comprises means for averaging disparities corresponding to at least two different times.

* * * * *